(12) United States Patent
Yu et al.

(10) Patent No.: US 11,762,795 B2
(45) Date of Patent: Sep. 19, 2023

(54) SCALABLE ROUND-ROBIN ARBITER TREE FOR ROUND-ROBIN ARBITRATION

(71) Applicant: Microsoft Technology Licensing, LLC, Redmond, WA (US)

(72) Inventors: Shu-Yi Yu, Sunnyvale, CA (US); Nicolas Mellis, Mountain View, CA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 79 days.

(21) Appl. No.: 17/322,612

(22) Filed: May 17, 2021

(65) Prior Publication Data

US 2022/0365894 A1    Nov. 17, 2022

(51) Int. Cl.
*G06F 13/37* (2006.01)
*G06F 13/34* (2006.01)
*G06F 13/362* (2006.01)

(52) U.S. Cl.
CPC .............. *G06F 13/37* (2013.01); *G06F 13/34* (2013.01); *G06F 13/3625* (2013.01)

(58) Field of Classification Search
CPC ...... G06F 13/37; G06F 13/372; G06F 13/374; G06F 13/376; G06F 13/378; G06F 13/34; G06F 13/3625
See application file for complete search history.

(56) References Cited

U.S. PATENT DOCUMENTS

| | | | |
|---|---|---|---|
| 5,832,278 A | 11/1998 | Pham | |
| 6,807,187 B1 * | 10/2004 | Sagi | H04L 47/50 711/111 |
| 7,305,507 B2 * | 12/2007 | Lavigne | G06F 13/364 710/111 |
| 7,735,856 B2 * | 6/2010 | Schlosser | B60R 21/233 280/730.2 |
| 10,838,892 B1 | 11/2020 | Kumar | |
| 10,949,258 B1 * | 3/2021 | Kumar | G06F 9/4881 |
| 2004/0068625 A1 * | 4/2004 | Tseng | G06F 13/364 711/151 |
| 2006/0095634 A1 * | 5/2006 | Meyer | G06F 13/364 710/309 |
| 2006/0221980 A1 | 10/2006 | Bose et al. | |
| 2013/0318270 A1 | 11/2013 | Tune | |
| 2014/0372648 A1 * | 12/2014 | Langadi | G06F 13/37 710/111 |

OTHER PUBLICATIONS

"International Search Report and Written Opinion Issued in PCT Application No. PCT/US22/026088", dated Jul. 20, 2022, 13 Pages.

* cited by examiner

*Primary Examiner* — Raymond N Phan
(74) *Attorney, Agent, or Firm* — Ray Quinney & Nebeker; Tiffany Healy

(57) ABSTRACT

The methods and systems may provide a scalable round-robin arbiter tree that performs round-robin arbitration for a plurality of requests received from a set of requestors. The round-robin arbiter may stack a plurality of round-robin cells in stages where an output of a first stage of round-robin cells is an input to a next stage of round-robin cells. The round-robin arbiter may transform an arbitration state at each stage of the arbitration and propagate the arbitration state into the next stage for arbitration. The arbitration state from the final stage round-robin cell is fed back to the first stage of the round-robin cells and used in a subsequent arbitration round.

17 Claims, 9 Drawing Sheets

US 11,762,795 B2

SCALABLE ROUND-ROBIN ARBITER TREE FOR ROUND-ROBIN ARBITRATION

BACKGROUND

Round-robin arbitration is a commonly used algorithm that tries to distribute a resource fairly among a plurality of requests for the resource. With the modern application-specific integrated circuits (ASICs) the need of increased parallel processing and computation demand requires massive threads of computation executed concurrently. Fair arbitration among large number of requesters becomes a challenge for both timing and area aspects.

BRIEF SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

One example implementation relates to a method for round-robin arbitration implemented by a round-robin arbiter. The method may include receiving, at the round-robin arbiter, an arbitration state and a first group of requests from a first set of requestors for the round-robin arbitration. The method may include determining a preliminary winning request of the first group of requests using one or more round-robin cells in a first stage of the round-robin arbiter. The method may include updating the arbitration state based on the first stage of the round-robin arbiter. The method may include determining a winning request based on the preliminary winning request and the arbitration state using a single round-robin cell in a second stage of the round-robin arbiter. The method may include updating the arbitration state based on the winning request. The method may include starting a new round of arbitration for the first group of requests from the first set of requestors based on the arbitration state using the one or more round-robin cells in the first stage of the round-robin arbiter.

Another example implementation relates to a round-robin arbiter. The round-robin arbiter may include a plurality of round-robin cells that receive a plurality of requests from a set of requestors for round-robin arbitration and identify a winning request of the plurality of requests based on the round-robin arbitration. The round-robin arbiter may include a plurality of stages with a plurality of round-robin cells in communication with each other, wherein an output of a first stage of round-robin cells is an input to a next stage of round-robin cells. The round-robin arbiter may include a state component in communication with the plurality of round-robin cells that maintains an arbitration state for the round-robin arbiter, wherein the arbitration state is propagated between the plurality of stages.

Another example implementation relates to a round-robin cell for use with a round-robin arbiter. The round-robin cell may include a plurality of flip flops; a plurality of muxes; a plurality of priority encoders; a plurality of logic gates; and a set of state flip flops, wherein the plurality of flip flops, the plurality of muxes, the plurality of priority encoders, the plurality of the logic gates, and the set of state flip flops are placed in an order in communication with each other and operable to: receive a plurality of requests and an arbitration state of the round-robin cell, wherein the arbitration state indicates that the round-robin cell starts an arbitration round for the plurality of requests; identify a winning request of the plurality of requests; update the arbitration state of the round-robin cell; and propagate the arbitration state to a next stage in the arbitration round.

Additional features and advantages will be set forth in the description that follows. Features and advantages of the disclosure may be realized and obtained by means of the systems and methods that are particularly pointed out in the appended claims. Features of the present disclosure will become more fully apparent from the following description and appended claims, or may be learned by the practice of the disclosed subject matter as set forth hereinafter.

BRIEF DESCRIPTION OF THE DRAWINGS

In order to describe the manner in which the above-recited and other features of the disclosure can be obtained, a more particular description will be rendered by reference to specific implementations thereof which are illustrated in the appended drawings. For better understanding, the like elements have been designated by like reference numbers throughout the various accompanying figures. While some of the drawings may be schematic or exaggerated representations of concepts, at least some of the drawings may be drawn to scale. Understanding that the drawings depict some example implementations, the implementations will be described and explained with additional specificity and detail through the use of the accompanying drawings in which.

DETAILED DESCRIPTION

This disclosure generally relates to round-robin arbitration. Round-robin arbitration is a commonly used algorithm that tries to distribute a resource fairly among a plurality of requests for the resource. With the modern application-specific integrated circuits (ASICs) the need of increased parallel processing and computation demand requires massive threads of computation executed concurrently. For example, in computer networking, thousands of requests may be received for a resource. Fair arbitration among large number of requesters becomes a challenge for both timing and area aspects.

Figure 1:
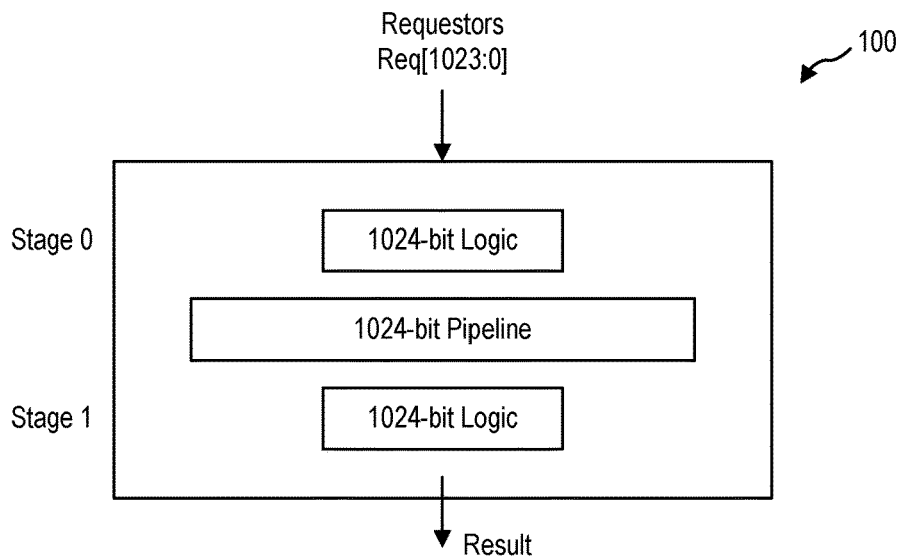
FIG. 1 illustrates an existing pipelined round-robin arbiter.

Referring now to FIG. 1, illustrated is a traditional round-robin arbiter 100. Most applications using the traditional round-robin arbiter 100 do not have large number of requesters for the resources. However, if the traditional round-robin arbiter 100 is scaled to process thousands of requesters, a performance problem occurs by causing large area overhead in order to be scaled to process thousands of requesters. As such, the traditional round-robin arbiter 100 results in large overhead costs for processing large amounts of requests using a high speed clock.

Figure 2:
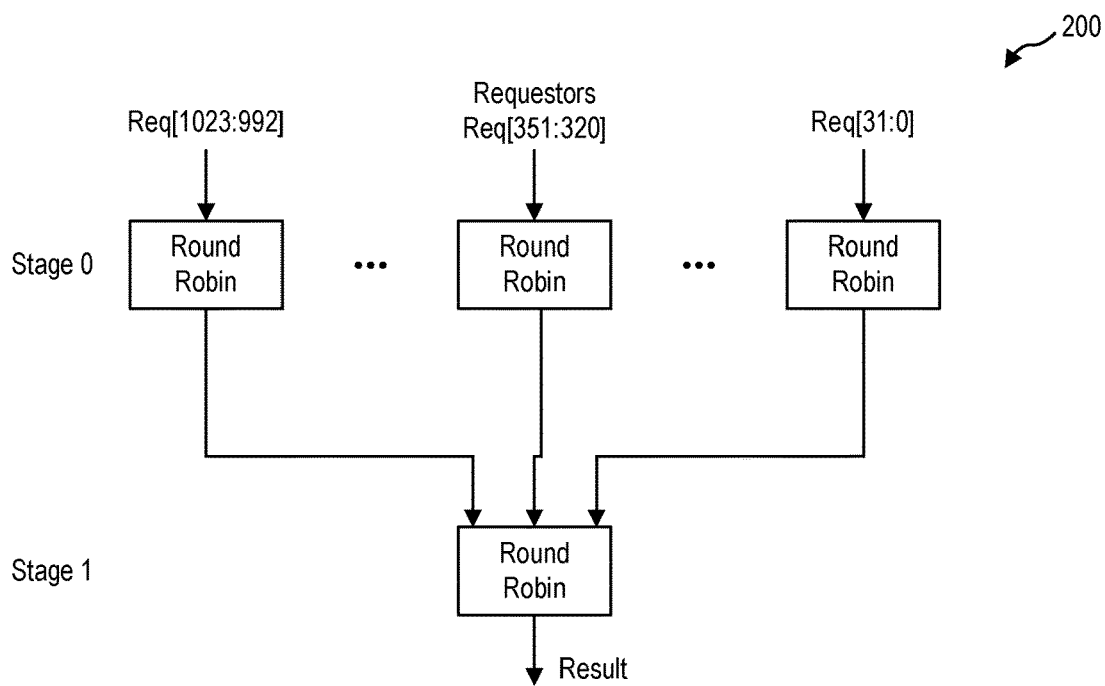
FIG. 2 illustrates an existing multi-stage round-robin arbiter.

Referring now to FIG. 2, a common low-overhead approach is to stack multiple independent round-robin arbiters together in a multi-stage round-robin arbiter 200. Multiple stages of round-robin arbiters are stacked together, and the first stage result is sent to the second stage arbiter for arbitration. With a multi-stage round-robin arbiter 200 approach, smaller round-robin arbiters are used, and therefore, avoiding the need of pipelining large-input arbiter, and the second stage logic is significantly smaller. However, the second-stage arbiter does not receive internal states of the first-stage arbiters (e.g., the second-stage is unaware of what occurred in the first-stage arbiters), and therefore, does not provide true round-robin arbitration and may starve certain requestors. Moreover, each round-robin arbiter is acting independently from each other. Each round-robin arbiter has its own priority and a last requestor that they granted to and is using this information to determine which requestor to designate next. As such, the multi-stage round-robin arbiter 200 approach may create severe performance problem depending on traffic patterns.

Instead of stacking round-robin arbiters directly, the present disclosure uses a scalable round-robin arbiter tree that stacks specially designed round-robin cells in stages. The present disclosure provides a scalable round-robin arbiter that is high-speed, may be pipelined, and has extremely low area overhead. Moreover, the scalable round-robin arbiter provides true fair round-robin arbitration among all the requesters and can be scaled to any number of requesters easily. As such, the present disclosure includes several practical applications that provide benefits and/or solve problems associated with round-robin arbitration.

The round-robin arbiter may stack a plurality of round-robin cells in stages where an output of a first stage of round-robin cells is an input to a next stage of round-robin cells. The round-robin arbiter receives a plurality of requests for one or more resources from a set of requestors and determines which request of the plurality of requests is the winning request to receive the grant of the resource(s). The round-robin arbiter may propagate an arbitration state into the next stage for arbitration. The arbitration state from the final stage round-robin cell is fed back to the first stage of the round-robin cells and used in a subsequent arbitration round.

The round-robin arbiter of the present disclosure performs each stage of arbitration in a single cycle of the clock. As such, if the round-robin arbiter includes multiples stages, the arbitration calculation may take multiple clock cycles (e.g., the number of stages included in the round-robin arbiter). The present disclosure may maintain multiple states in parallel for different input groups to not waste any clock cycles. As soon as a winner is determined, the arbitration state in the round-robin arbiter is updated and a new round of arbitration with the updated arbitration state may begin in the next clock cycle, resulting in a high-speed round-robin arbiter.

Moreover, instead of multiple stages of round-robin arbiters operating independently, and having later stage ignoring the arbitration result of earlier stages which causes unfair arbitration, the present disclosure uses a specially designed round-robin cell that propagates the arbitration state into the next stage for arbitration. The arbitration state of the final stage round-robin cell is then fed back to the first stage of the round-robin cells and used in a subsequent arbitration round.

The present disclosure uses a combined arbitration state with a single bit set (one-hot) to communicate the arbitration state within each stage (e.g., within stage 0) of the round-robin arbiter tree and communicates the arbitration state to a next stage downward in the round-robin arbiter tree (e.g., stage 1). For example, the single bit may be a highest bit and everything to the left of the single bit is high priority and everything to the right of the single bit is low priority. The present disclosure uses an outpriority shift and an in-priority shift in the round-robin cells to communicate the arbitration state and priority among the round-robin cells within a stage. The outpriority shift indicates where the high priority is for the next round. Only one round-robin cell may have a high in-priority bit.

The round-robin cell with the high in-priority bit (e.g., the only round-robin cell with the in-priority bit set as high) performs an upper mask to determine if the round-robin cell has a high priority request for the resource. The mask may create a priority system that assists in determining whether the requests are a high priority relative to other requests. If the round-robin cell has a high priority request for the resource, the round-robin cell sets the outpriority as high and provides the high priority request as the winning request. If the round-robin cell does not have a high priority request, the outpriority shift is set to a next round-robin cell (e.g., the round-robin cell directly to the left with wraparound, if necessary). The outpriority shift may shift the arbitration state priority to the next round-robin cell (e.g., the round-robin cell to the left). The arbitration state is transformed at each stage of the arbitration and propagated to the next stage in the round-robin arbiter tree. For example, an intermediate arbitration state output from a first stage may include one set of bits (e.g., 1024 state bits) and the arbitration state output from a second stage may include another set of bits (e.g., 32 state bits).

As such, the round-robin arbiter of the present disclosure changes the arbitrations state at each stage of the arbitration and propagates the arbitration state into the next stage for arbitration. Moreover, the round-robin arbiter has low area overhead and is scalable. In addition, the round-robin arbiter may be converted to different number of inputs or number of stages depending on the process node.

One technical advantage of the present disclosure is achieving round-robin arbitration results with significantly lower overhead as compared to direct pipelining of a round-robin arbiter. Another technical advantage of the present disclosure is delivering better arbitration results than the conventional stacked round-robin arbiter approach.

The present disclosure may be used anywhere arbitration may be needed to allocate resources to competing requests. For example, the round-robin arbiter of the present disclosure may be used in small integrated circuit chips in a cell phone or a computer. Another example includes the round-robin arbiter used in places with a large volume of integrated circuit chips talking to each other. For example, data centers may have thousands of integrated circuit chips and processes talking to each other and the round-robin arbiter of the present disclosure is scalable to support the requests received in data centers. Moreover, networking environments typically have thousands of requests and the round-robin arbiter of the present disclosure may be used to arbitrate the requests received in the networking environments.

Figure 3:
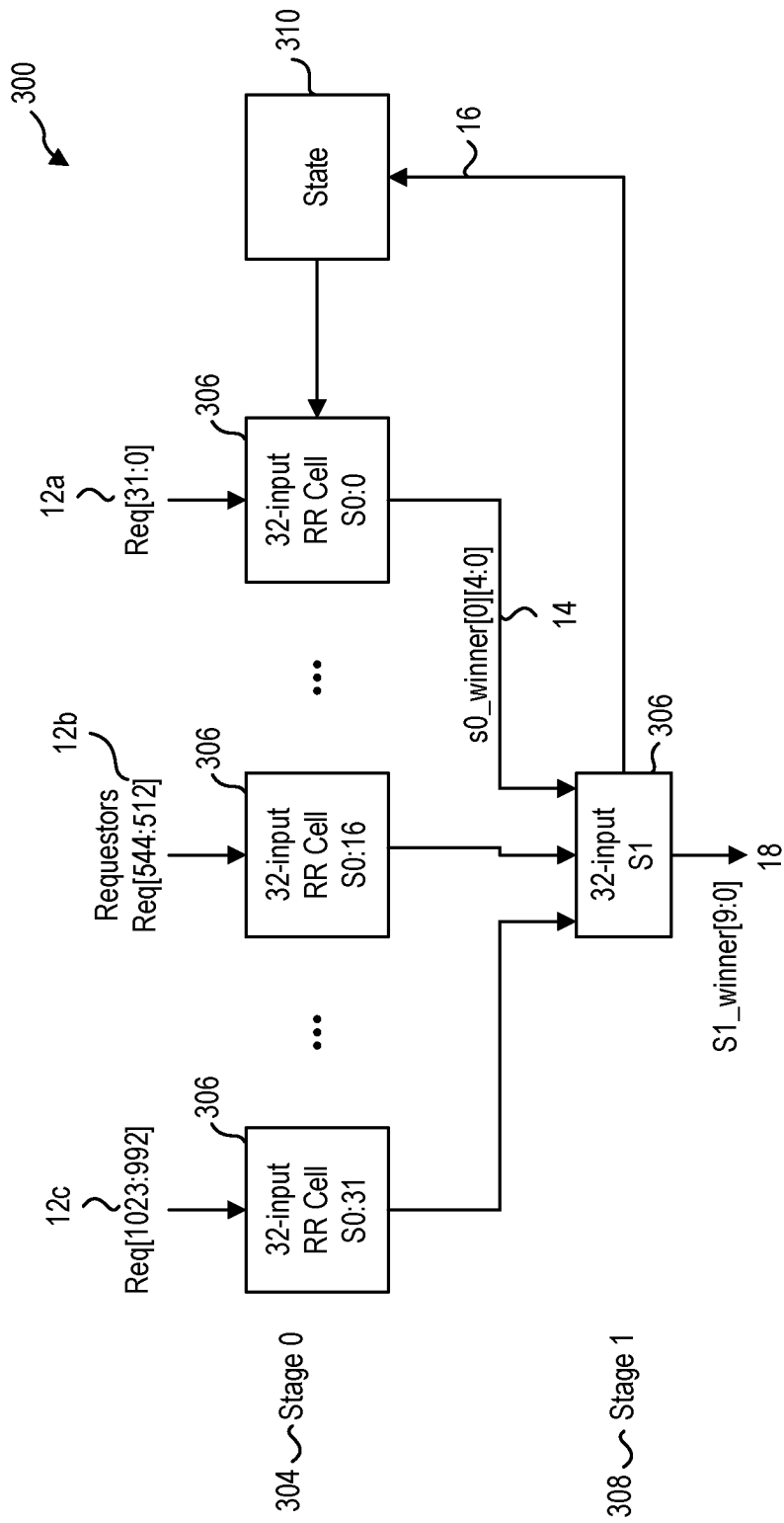
FIG. 3 illustrates a round-robin arbiter tree in accordance with implementations of the present disclosure.

Referring now to FIG. 3, illustrated is a scalable multi-stage round-robin arbiter 300 tree that stacks round-robin cells 306 in multiple stages (e.g., stage 0 and stage 1). The round-robin arbiter 300 may be implemented in an integrated circuit chip and may be used in any environment where arbitration for one or more resources may be necessary. One example of an integrated circuit chip includes an application-specific integrated circuit (ASIC) chip customized for a particular use.

Round-robin arbiter 300 illustrates an example of a 1024-input arbiter divided into 2 stages (e.g., stage 0 and stage 1) of 32-input round-robin cells 306 each. While only three round-robin cells 306 (e.g., S0:0, S0:16, S0:31) are illustrated for stage 0 in this example, stage 0 includes thirty two 32-input round-robin cells, where the round-robin cell 306 S0:0 corresponds to the first 32-input round-robin cell in the round-robin arbiter 300, the round robin cell 306 S0:16 corresponds to the seventeenth 32-input round-robin cell in the round-robin arbiter 300, and the round-robin cell 306 S0:31 corresponds to the thirty second 32-input round robin cell in the round-robin arbiter 300. Stage 1 includes one 32-input round-robin cell 306 (e.g., S1).

The round-robin arbiter 300 receives a plurality of requests from a set of requestors for one or more resources and determines which request of the plurality of requests is the winning request 18 to receive the grant of the resource(s). The winning request 18 may be based on a priority of the request and/or when the request is received. For example, the winning request 18 may have a higher priority relative to other requests received by the round-robin arbiter 300. Another example may include the winning request 18 having a same priority as other requests received by the round-robin arbiter 300 but is received earlier relative to the other requests.

The round-robin arbiter 300 may receive a plurality of requests. The requests may come from a plurality of sources (e.g., requestors). For example, the round-robin arbiter 300 may have four sources of requests (with 1024 requests each). The round-robin arbiter 300 may distribute different requestors among different clock cycles and may distribute the requests for each requestor evenly among the round-robin cells 306 so that each round-robin cell has an equal share of the arbiter throughput. For example, a first requestor of the set of requestors may send the requests 12a, 12b, 12c.

The groups of requests from a set of requestors received by the round-robin arbiter 300 may be based on the source of the request. For example, requests from the same source may be placed into the same arbitration round to prevent the same requests from having high odds of selection from a different set of requestors and keeping the arbitration fair among the different requests. Moreover, each request may be placed into a single set of requestors. As such, the requestor to request assignments may be exclusive preventing a request from winning in two separate sets of requestors that are arbitrated at the same time.

The set of requestors may also be based on a quality of service requirement of the requests. Requests with a high quality of service requirement are placed into one set of requestors (e.g., a first set of requestors) while requests with a low quality of service requirement are placed in a different set of requestors (e.g., a second set of requestors) that may be arbitrated at a different time. For example, a first set of requestors (Group 0) is a high priority service and is arbitrated at cycle 0. A second set of requestors (Group 1) is a low priority service and is arbitrated at cycle 1. The first set of requestors (Group 0, the high priority service) is arbitrated again at cycle 2. As such, the set of requestors may be selected based on a variety of factors.

The number of groups of requests may equal the number of round-robin cells 306 in stage 0 (e.g., thirty two groups of requests). For example, the groups of requests may equal thirty two, each with thirty requests, resulting in 1024 requests. Each round-robin cell may receive one group of thirty two requests with thirty two requests, where the requests 12a corresponds to a first set of 32 requests, the requests 12b corresponds to a seventeenth set of 32 requests, and the requests 12c corresponds to the thirty second set of 32 requests. As such, each 32-input round-robin cell receives thirty two groups of requests (e.g., 12a, 12b, 12c) from the first requestor and determines which request is the winning request 14.

In the first election performed by each of the round-robin cells 306 at stage 0 (e.g., S0:0, S0:16, S0:31), the round-robin cells 306 determine preliminary results identifying the winning request 14 to receive the grant from the plurality of requests (e.g., 12a, 12b, 12c) received from the set of requestors. The round-robin arbiter 300 may only have one round-robin cell 306 in stage 0 with a high priority with the remaining 31 round-robin cells 306 with a low priority. For example, the round-robin arbiter 300 may initially set the first round-robin cell 306 (e.g., S0:0) with an arbitration state of a high priority.

The round-robin cell 306 with the high priority (e.g., S0:0) performs an upper mask to determine if the round-robin cell 306 has a high priority request for the resource. If the round-robin cell 306 has a high priority request for the resource, the round-robin cell 306 sets the outpriority as high and provides the high priority request as the winning request 14.

If the round-robin cell 306 does not have a high priority request, the round-robin cell 306 may shift the arbitration state of a high priority to a next round-robin cell 306 (e.g., the next round-robin cell on the left) and the next round-robin cell 306 performs the same processing to identify a high priority request. For example, if the round-robin cell 306 (S0:0) has high priority and does not have a high priority request, the arbitration state is shifted to the next round-robin cell to the left (S0:1).

The winning request 14 from the round-robin cells 306 in stage 0 (e.g., S0:0, S0:16, S0:31) is propagated down to the stage 1 round-robin cell 306 (e.g., S1). In addition, an intermediate arbitration state from the stage 0 round-robin cells 306 is propagated to the stage 1 round-robin cell 306 (e.g., S1). For example, the intermediate arbitration state may include 1024 state bits. The stage 1 round-robin cell 306 (e.g., S1) may use the preliminary results (e.g., the winning request 14) from the stage 0 round-robin cells 306 (e.g., S0:0, S0:16, S0:31) in determining a winning request 18 to receive the grant of the resource(s). As such, the round-robin cell 306 (e.g., S1) receives thirty two inputs from the stage 0 round-robin cells 306 (e.g., S0:0, S0:16, S0:31), one of which is identified as the winning request 14 and determines the winning request 18 based on the received inputs from stage 0. The outputs of the 32 round-robin cells 306 at stage 0 (50:0, S0:16, 50:31) become one set of 32 inputs for the round-robin cell 306 at stage 1 (e.g., S1).

For example, each round-robin cell 306 at stage 0 has a single output priority bit output as the current arbitration state of the round-robin cell 306 (e.g., high priority or low priority) that becomes one 32 bit arbitration state input for the round-robin cell 306 at stage 1 (e.g., S1). In addition, the winning request 14 and the granted requests of the 32 of the round-robin cells 306 at stage 0 (e.g., 50:0, S0:16, 50:31)

become a group of 32 requests received by the round-robin cell 306 at stage 1 (e.g., S1). The round-robin cell 306 at stage 1 (e.g., S1) outputs a single winning request 18 for the plurality of requests (e.g., 12*a*, 12*b*, 12*c*). The round-robin cell 306 at stage 1 (e.g., S1) may output an index of the winning request 18. The index identifies which request out of the 1024 requests receives the resource. For example, if a log 2 is performed of the 1024 connections, a 10 bit value is the result of the arbitration and provides the index that identifies which request won of the 1024 connections.

In addition, the round-robin cell 306 at stage 1 (e.g., S1) outputs a single output priority bit set with one bit hot (e.g., a 1024 bit signal with one bit set) updating the arbitration state 16 of the round-robin arbitration by shifting the high priority arbitration state to a next round-robin cell to the left of the round-robin cell that is receiving the winning request 18. For example, the arbitration state at stage 1 may include 32 state bits. The round-robin cell 306 at stage 1 (e.g., S1) may change the arbitration state from 32 state bits to 1024 state bits and output the 1024 state bits with one bit set as the updated arbitration state 16. The updated arbitration state 16 of the round-robin arbitration is stored in a flop in a state component 310 that maintains the updated arbitration state and provides the updated arbitration state 16 as input to the round-robin cells 306 in stage 0 (e.g., S0:0, S0:16, S0:31). The round-robin cells 306 in stage 0 (e.g., S0:0, S0:16, S0:31) may begin another round of arbitration on the plurality of requests (e.g., 12*a*, 12*b*, 12*c*) received from the set of requestors based on the updated state 16. For example, the round-robin cell 306 in stage 0 which receives the arbitration state of a high priority may start the arbitration round. As such, the updated arbitration state 16 indicates that the previous winner has the lowest priority arbitration state and that the round-robin-cell 306 to the left of the previous winner now has the highest priority arbitration state.

The round-robin arbiter 300 may perform each stage of arbitration in a single cycle of the clock. For example, the round-robin arbiter 300 includes two stages and the round-robin arbiter 300 may perform the arbitration in a two-cycle calculation, one clock cycle per stage of the round-robin arbiter 300. As soon as a winner is determined, the arbitration state in the round-robin arbiter is updated and a new round of arbitration with the updated arbitration state may begin in the next clock cycle, resulting in a high-speed round-robin arbiter. As such, if there are m stages (where m is a positive integer) in the round-robin arbiter 300, the calculation for the arbitration takes m clock cycles (one clock cycle per stage).

Depending on the application and/or the process node, the round-robin arbiter 300 may be scaled to any N-input M-stage arbiter tree (where N and M are positive integers). As such, the number of stages and/or the number of round-robin cells included in the round-robin arbiter 300 may vary. In addition, the number of round-robin cells and/or the number of stages included in the round-robin arbiter 300 may be based on the speed of the clock and whether the round-robin arbiter 300 may be able to perform a one stage calculation per clock cycle.

While only one set of requestors (e.g., 12*a*, 12*b*, 12*c*) is illustrated, a plurality of sets of requestors may be arbitrated at the same time using different stages of the round-robin arbiter 300 tree. As such, different sets of requestors may participate in different arbitrations at the same time using different stages of the round-robin arbiter 300. The number of sets of requestors that may be arbitrated at the same time may equal the number of stages in the round-robin arbiter 300 tree. For example, if the round-robin arbiter 300 tree has three stages, three sets of requestors with three different groups of requests may be arbitrated at the same time using different stages of the round-robin arbiter 300 tree. Each stage of the round-robin arbiter 300 tree may be a pipeline stage without sharing between two sets of requestors. In addition, different stages of the round-robin arbiter 300 tree may be assigned to different sets of requestors. Having multiple stages of the round-robin arbiter 300 tree active at one time may increase the throughput of the round-robin arbiter 300 tree.

Figure 4:
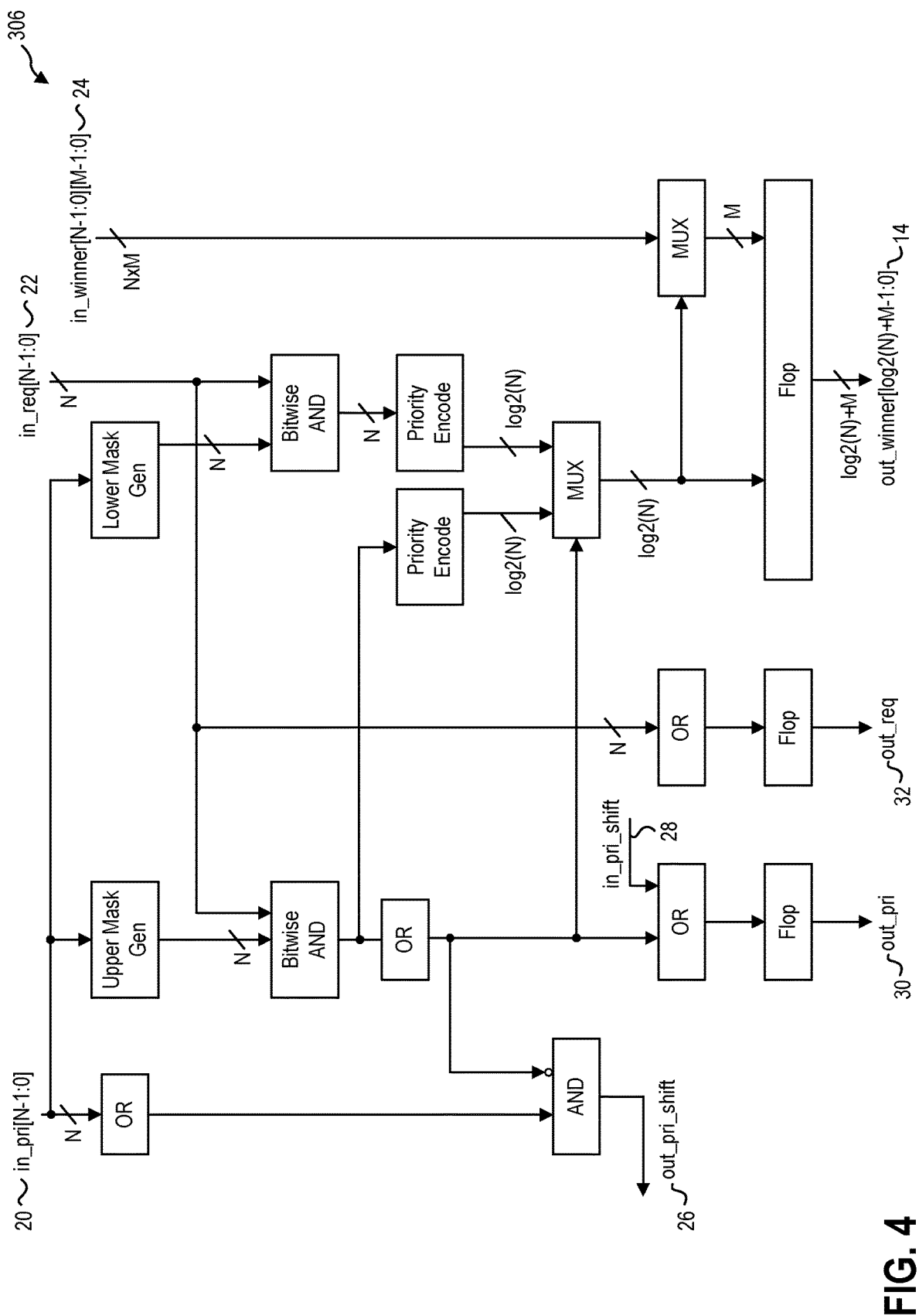
FIG. 4 illustrates a round-robin cell for use with a round-robin arbiter tree in accordance with implementations of the present disclosure.

Referring now to FIG. 4, illustrated is an example round-robin cell 306 for use with the round-robin arbiter 300 (FIG. 3) tree that receives a plurality of requests 22 and determines a winning request 14 of the plurality of requests 22. The plurality of requests 22 may be a group of 32 requests (e.g., from a first requestor). The round-robin cell 306 includes a combination of a plurality of flip flops, muxes, priority encoders, logic gates (and, or, not), and a set of state flip flops placed in an order in communication with each other to determine a priority of the round-robin cell 306 and a winning request 14 for the plurality of requests 22.

The round-robin cell includes an in-priority bit 20 that indicates an arbitration state of the round-robin cell 306. For example, the in-priority bit is a 32 bit priority that adds to 1024. The arbitration state of the round-robin cell 306 may include a high priority or a low priority. A high priority may indicate which round-robin cell 306 is next to a round-robin cell 306 that received the last grant and starts a next round of arbitration and the low priority may indicate which round-robin cells 306 recently received a grant and/or recently started an arbitration round. The round-robin arbiter 300 may only have one round-robin cell 306 that includes a high priority in-priority bit 20 (e.g., one bit of the 32 bits set to a "1" with the remaining bits set to "0"). For example, during a first round of arbitration, a first round-robin cell 306 in the round-robin arbiter 300 tree may initially have the arbitration state set with a high priority (e.g., one bit of the 32 bits set to 1) while the remaining round-robin cells 306 in the round-robin arbiter 300 tree have an arbitration state with a low priority (e.g., all bits set to 0). In subsequent rounds of arbitration, only one round-robin cell 306 has an arbitration state with a highest priority (e.g., the round-robin cell to the left of the round-robin cell that received the last grant). The remaining round-robin cells 306 all have an arbitration state indicating a low priority.

The round-robin cell 306 performs an upper mask to determine whether any of the requests 22 include a high priority request. If the round-robin cell 306 has one or more high priority requests 22, the upper mask determines one high priority request for the granted high priority request 22.

The round-robin cell 306 also performs a lower mask to determine whether any of the requests 22 include a low priority request. If the round-robin cell 306 has a low priority request 22, the lower mask determines one low priority request for the granted low priority request 22.

If the round-robin cell 306 has both a granted high priority request 22 and a granted low priority request 22, the granted high priority request 22 has priority and the granted high priority request is outputted as the winning request 14. The winning request 14 is stored in a flop of the round-robin cell 306 to propagate on the next clock edge to the round-robin cell 306 in stage 1 of the round-robin arbiter 300 tree.

The round-robin cell 306 may use an out request 32 to verify that the granted high priority request 22 and/or the granted low priority request 22 are valid requests to the round-robin cell 306. The out request 32 may qualify the winner and verify that the winner is a valid request. If the round-robin cell 306 has any requests 22, the out request 32 is high and indicates that the winning request 14 based on the requests 22 is valid.

In addition, if the round-robin cell has a granted high priority request 22, the round-robin cell 306 sets the out priority arbitration state 30 as high. If the round-robin cell 306 does not have a high priority request 22, the granted low priority request 22 is output as the winning request 14 and the round-robin cell 306 sets the out priority arbitration state 30 to low. The out priority arbitration state 30 is stored in a flop of the round-robin cell 306 to propagate on the next clock edge to the round-robin cell 306 in stage 1 of the round-robin arbiter 300 tree.

If the round-robin cell 306 does not have a granted high priority request 22, the round-robin cell 306 shifts the arbitration state of a high priority to a next round-robin cell directly the left of the round-robin cell 306 using the outpriority shift 26. As such, the arbitration state of a high priority is set to the round-robin cell on the left and shifts to the next round-robin cell to the left. The next round-robin cell 306 receives the arbitration state change through the in-priority shift 28. The next round-robin cell 306 performs the same processing to identify whether the next round-robin cell 306 has a granted high priority request.

Figure 5:
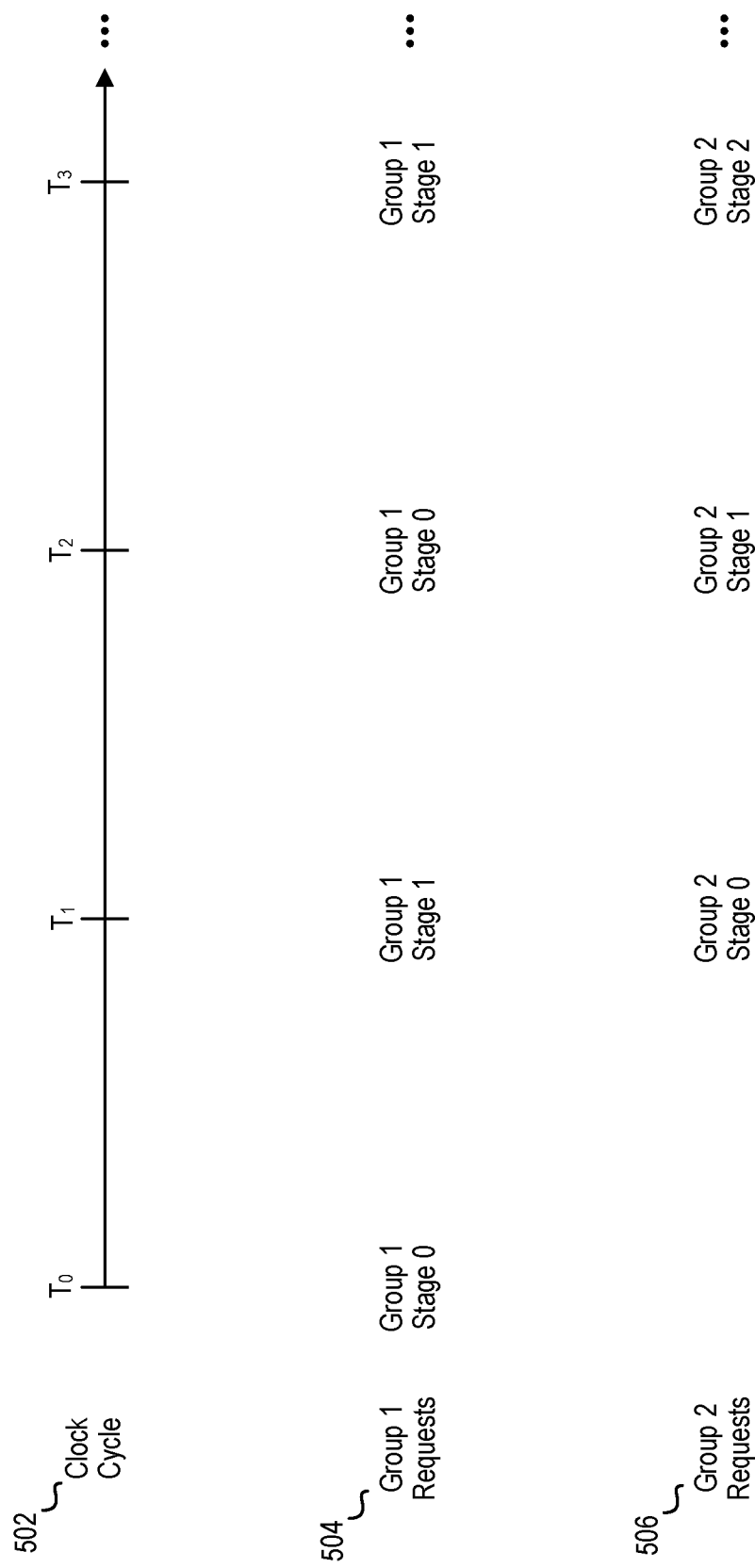
FIG. 5 illustrates an example of arbitrating two different groups of requests in accordance with implementations of the present disclosure.

Referring now to FIG. 5, illustrated is an example of arbitrating two different groups of requests, a Group 1 requests 504 and a Group 2 requests 506, received from different sets of requestors concurrently using the round-robin arbiter 300 tree (FIG. 3) based on a clock cycle 502. For example, the Group 1 requests 504 may be from a first set of requestors (e.g., 12a, 12b, 12c) and the Group 2 requests 506 may be from a second set of requestors, different from the first set of requestors. The robin-robin arbiter 300 tree may perform each stage of arbitration in a single cycle of the clock, resulting in a high-speed round-robin arbiter 300.

At a first clock cycle (e.g., $T_0$), the Group 1 requests 504 are processed by a plurality of round-robin cells 306 at stage 0 (e.g., S0:0, S0:16, S0:31 FIG. 3) of the round-robin arbiter 300 tree.

At a second clock cycle (e.g., $T_1$), the Group 1 requests 504 are processed by the round-robin cell 306 at stage 1 (e.g., S1) of the round-robin arbiter 300 tree. In addition, during the second clock cycle, the Group 2 requests 506 are processed by the plurality of round-robin cells 306 at stage 0 (e.g., S0:0, S0:16, S0:31) of the round-robin arbiter 300 tree. As such, both the Group 1 requests 504 and the Group 2 requests 506 are processed at the same time by different stages of the round-robin arbiter 300 tree during the second clock cycle.

During a third clock cycle (e.g., $T_2$), the Group 1 requests 504 start again at the plurality of round-robin cells 306 at stage 0 (e.g., S0:0, S0:16, S0:31) in a different round of the arbitration, and the Group 2 requests 506 are processed by the round-robin cell 306 at stage 1 (e.g., S1) of the round-robin arbiter 300 tree.

During a fourth clock cycle (e.g., $T_3$), the Group 1 requests 504 move to the round-robin cell 306 at stage 1 (e.g., S1) of the round-robin arbiter 300 tree and the Group 2 requests 506 start a different round of arbitration at the plurality of round-robin cells 306 at stage 0 (e.g., S0:0, S0:16, S0:31).

The Group 1 requests 504 and the Group 2 requests 506 may continue to move between the different stages of the round-robin arbiter 300 tree during each clock cycle until the arbitration is complete for the two sets of requestors. Each stage of the round-robin arbiter 300 tree is a pipeline stage without sharing between the two sets of requestors during a clock cycle. As such, different stages of the round-robin arbiter 300 tree are assigned to different sets of requestors without having two stages active at the same time for the same set of requestors. By using different stages of the round-robin arbiter 300 tree to arbitrate different sets of requestors during the same clock cycles, the throughput of the round-robin arbiter 300 tree may increase.

Figure 6A:
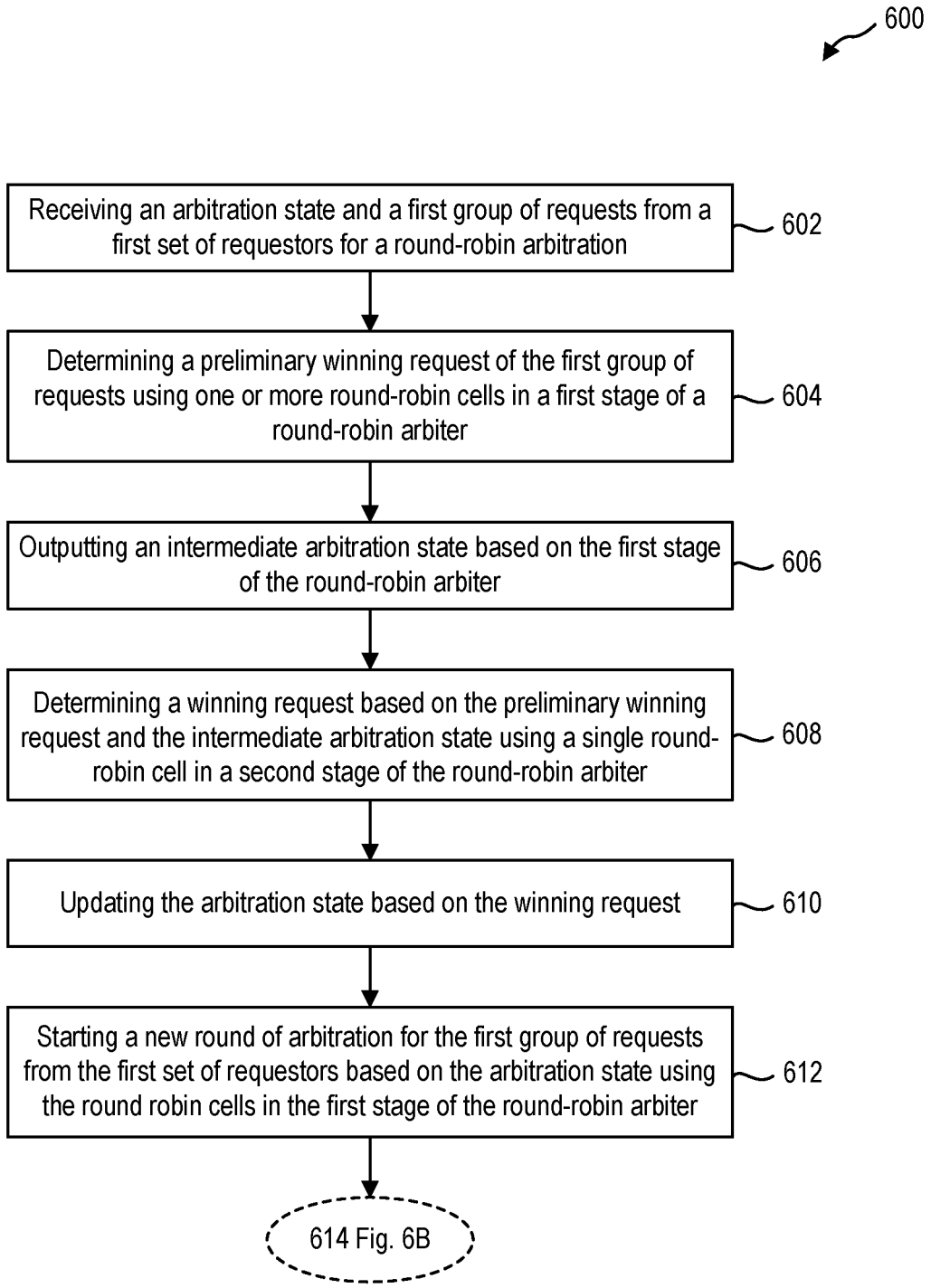
FIGS. 6A and 6B illustrate an example method for performing round-robin arbitration in accordance with implementations of the present disclosure.
Figure 6B:
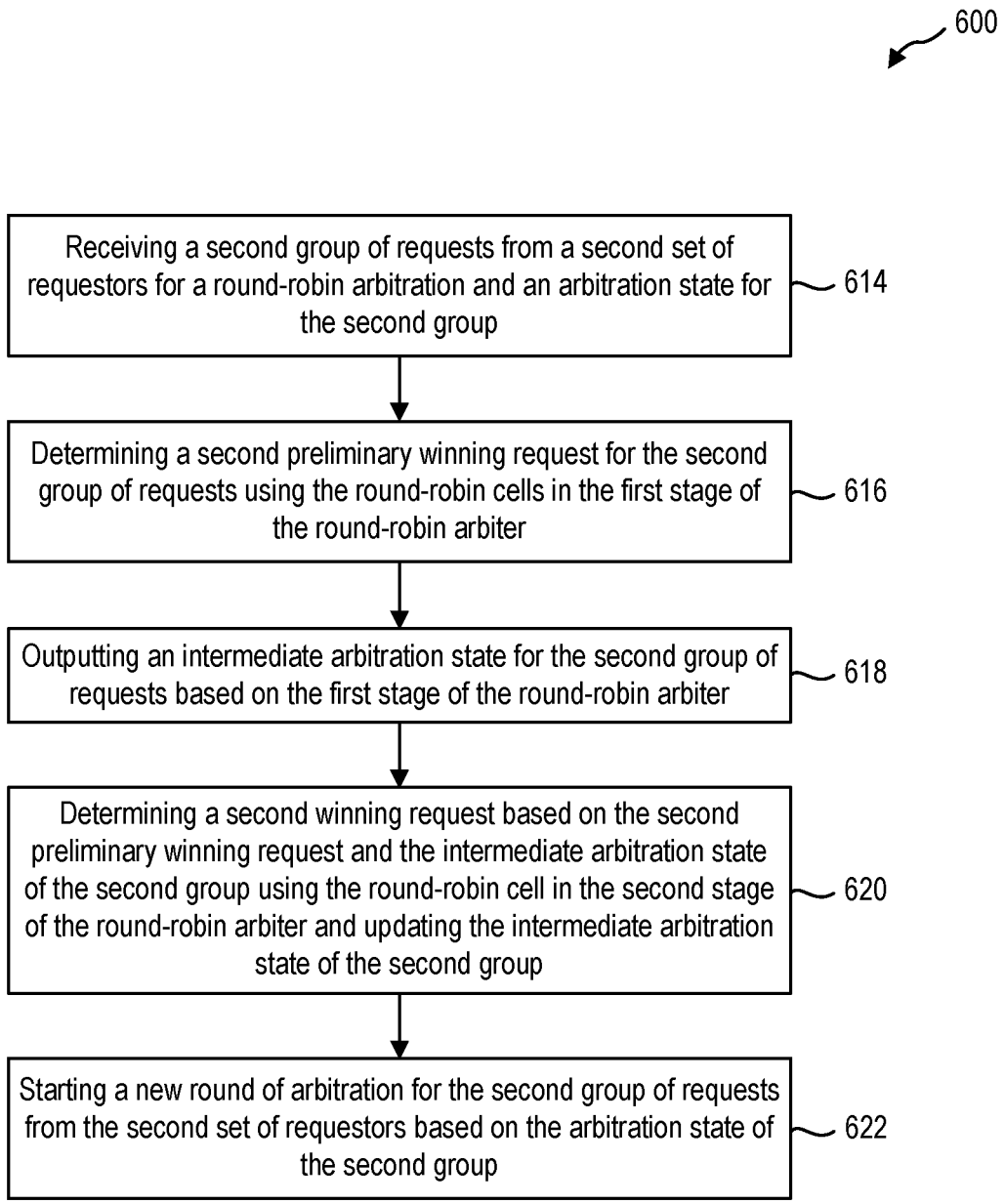

Referring now to FIGS. 6A and 6B illustrated is an example method 600 for round-robin arbitration for a plurality of requests. Method 600 may be implemented by a round-robin arbiter 300 tree (FIG. 3). The actions of method 600 may be discussed below with reference to the architectures of FIGS. 3 and 4.

At 602, method 600 includes receiving an arbitration state and a first group of requests from a first set of requestors for a round-robin arbitration. The round-robin arbiter 300 tree may receive a first group of requests from a first set of requestors (e.g., 12a, 12b, 12c) for a round-robin arbitration. For example, the plurality of requests may want access to the same resource or set of resources and the round-robin arbitration determines an order of providing access to the resources to the different requests.

The round-robin arbiter 300 may be divided into a plurality of stages with each stage having one or more round-robin cells 306 in communication with each other. The output of a first stage of round-robin cells 306 may be an input to a next stage of round-robin cells 306. For example, the round-robin arbiter 300 tree may include a 1024-input arbiter divided into two stages (e.g., stage 0 and stage 1) with stage 0 having thirty two 32-input round-robin cells 306 and stage 1 having one 32-input round-robin cell 306. As such, the round-robin arbiter 300 may receive groups of 1024 requests (e.g., 12a, 12b, 12c) from a first set of requestors and perform the round-robin arbitration for the 1024 requests to identify a winning request 18. The groups of requests may come from a plurality of sources (e.g., requestors). For example, the round-robin arbiter 300 may have four sources of requests (e.g., a set of requestors) with 1024 requests each. The round-robin arbiter 300 may distribute the set of requestors among different clock cycles. For example, a first set of requestors with requests 12a, 12b, 12c may be evenly distributed among the round-robin cells 306 so that each round-robin cell 306 has an equal share of the arbiter throughput. On a next clock cycle, the round-robin arbiter may distribute the second requestor and the corresponding requests among the round-robin cells 306, on a following clock cycle, the round-robin arbiter may distribute the third requestor and the corresponding requests among the round-robin cells 306, and on a following clock cycle, the round-robin arbiter may distribute the fourth requestor and the corresponding requests among the round-robin cells 306.

At 604, method 600 includes determining a preliminary winning request of the first group of requests using one or more round-robin cells in a first stage of a round-robin arbiter. The round-robin cells 306 in a first stage (e.g., stage 0) of the round-robin arbiter 300 tree (e.g., S0:0, S0:16, S0:31) may determine a preliminary winning request 14. The preliminary winning request 14 may be identified from a round-robin cell 306 in the first stage with an arbitration state set as a high priority.

The round-robin cell 306 with the high priority (e.g., S0:0) may perform an upper mask to determine if the round-robin cell has a high priority request for the resource. If the round-robin cell 306 has a high priority request for the resource, the round-robin cell 306 sets the outpriority arbitration state as high and provides the high priority request as the preliminary winning request 14. If the round-robin cell 306 does not have a high priority request, the round-robin cell 306 may set the outpriority arbitration state as low and the high priority arbitration state shifts to a next round-robin cell (e.g., a next round-robin cell on the left) and the next round-robin cell performs the same processing to identify a high priority request.

At 606, method 600 includes outputting an intermediate arbitration state based on the first stage of the round-robin arbiter. The round-robin arbiter 300 may only have one round-robin cell 306 in stage 0 with an arbitration state set as a high priority with the remaining round-robin cells 306 with an arbitration state set as a low priority. The round-robin cell 306 with the arbitration state set as a high priority may be the round-robin cell 306 with the preliminary winning request 14.

At 608, method 600 includes determining a winning request based on the preliminary winning request and the arbitration state using a single-round robin cell in a second stage of the round-robin arbiter. The winning request 14 from the round-robin cells 306 in stage 0 and the intermediate arbitration state from the round-robin cells 306 in stage 0 is propagated down to the stage 1 round-robin cell 306 (e.g., S1). The stage 1 round-robin cell 306 (e.g., S1) may use the preliminary results (e.g., the winning request 14) from the stage 0 round-robin cells 306 and the intermediate arbitration state from the stage 0 round-robin cells 306 in determining a winning request 18 to receive the grant of the resource(s). For example, the round-robin cell 306 (e.g., S1) outputs an index of the winning request 18. The index identifies which request out of the 1024 requests receives the resource.

At 610, method 600 includes updating the arbitration state based on the winning request. The round-robin cell 306 at stage 1 (e.g., S1) outputs a single output priority bit set (one hot) updating the arbitration state 16 of the round-robin arbitration by shifting the high priority arbitration state to a next round-robin cell. For example, the arbitration state at stage 1 may include 32 state bits. The round-robin cell 306 at stage 1 (e.g., S1) may change the arbitration state from 32 state bits to 1024 state bits and may output a 1024 bit signal with one bit set as the updated arbitration state 16. The updated arbitration state 16 may shift one round-robin cell directly to the left of the round-robin cell that is receiving the winning request 18. The updated arbitration state 16 of the round-robin arbitration may be stored in a flop in a state component 310. The state component 310 may maintain the arbitration state 16 and communicate the updated arbitration state 16 to the round-robin cells 306 in the first stage (e.g., stage 0) and may provide the updated arbitration state 16 as input to the round-robin cells 306 in stage 0 (e.g., S0:0, S0:16, S0:31).

At 612, method 600 includes starting a new round of arbitration for the first group of requests from the first set of requestors based on the arbitration state using the round-robin cells in the first stage of the round-robin arbiter. The round-robin cells 306 in stage 0 may begin another round of arbitration on the first group of requests from the first set of requestors (e.g., 12*a*, 12*b*, 12*c*) based on the updated arbitration state 16. For example, the round-robin cell 306 in stage 0 which receives the arbitration state of a high priority may start the arbitration round. The updated arbitration state 16 may indicate that the previous winner has the lowest priority arbitration state and that the current round-robin-cell with the high priority arbitration state now has the highest priority.

At 614, method 600 may include receiving a second group of requests from a second set of requestors for a round-robin arbitration and an arbitration state for the second group. The round-robin arbiter 300 may receive a second group of requests from a second set of requestors, different from the first set of requestors (e.g., 12*a*, 12*b*, 12*c*), for a round-robin arbitration and an arbitration state for the second group. The round-robin arbiter 300 may have a group identifier (ID) for each set of requestors and may use the group ID to associate the arbitration state with an appropriate set of requestors. While the following steps discuss the second group of requests, the round robin arbiter 300 continues to arbitrate the first group of requests concurrently with the second group of requests using a different stage of the round robin arbiter 300.

At 616, method 600 may include determining a second preliminary winning request for the second group of requests using the round-robin cells in the first stage of the round-robin arbiter. The round-robin arbiter 300 may perform each stage of arbitration in a single cycle of the clock. As such, during a clock cycle when the first group of requests from the first set of requestors (e.g., 12*a*, 12*b*, 12*c*) moves to the second stage (e.g., stage 1) of the round-robin arbiter 300, the round-robin cells 306 in the first stage (e.g., stage 0) of the round-robin arbiter 300 may determine a second preliminary winning request 14 in the same clock cycle that the second stage of the round-robin arbiter 300 is processing the first group of requests and determining the winning request 18 for the first group. The second preliminary winning request 14 may include a high priority request from a round-robin cell 306 with an arbitration state set as a high priority.

At 618, method 600 may include updating the arbitration state for the second group of requests based on the first stage of the round-robin arbiter. The round-robin arbiter 300 may only have one round-robin cell 306 in stage 0 with an arbitration state set as a high priority with the remaining round-robin cells 306 with an arbitration state set as a low priority. The round-robin cell 306 with the arbitration state set as a high priority may be the round-robin cell 306 with the second preliminary winning request 14. The round-robin cell 306 with the arbitration state set as a high priority for the second group of requests may be different from the round-robin cell 306 with the arbitration state set as a high priority for the first group of requests.

At 620, method 600 may include determining a second winning request based on the second preliminary winning request and the arbitration state of the second group of requests using the round-robin cell in the second stage of the round-robin arbiter and updating the arbitration state of the second group of requests. The second preliminary winning request 14 from the round-robin cells 306 in stage 0 and the arbitration state for the second group of requests is propagated down to the stage 1 round-robin cell 306 (e.g., S1) on the clock edge. The stage 1 round-robin cell 306 (e.g., S1) may use the preliminary results and the arbitration state for the second group of requests from the stage 0 round-robin cells 306 in determining a second winning request 18 to receive the grant of the resource(s). For example, the round-robin cell 306 (e.g., S1) outputs an index of the second winning request 18 that identifies which request out of the plurality of requests from the second group receives the resource. During the same clock cycle where the second group of requests from the second set of requestors is processed by the stage 1 round-robin cell 306 (e.g., S1), a new round of arbitration may be starting for the first group of requests from the first set of requestors using the round-robin cells 306 in the first stage (e.g., stage 0).

At 622, method 600 may include starting a new round of arbitration for the second group of requests from the second set of requestors based on the arbitration state of the second group of requests using the round-robin cells in the first stage of the round-robin arbiter. The round-robin cells 306 in stage 0 may begin another round of arbitration on the second group of requests from the second set of requestors based on the updated arbitration state 16. The updated arbitration state 16 may indicate that the previous winner has the lowest priority arbitration state and that the current round-robin-cell with the high priority arbitration state now has the highest priority. During the same clock cycle that the new round of arbitration may be starting for the second group of requests using the first stage of round-robin cells 306, the first group of requests from the first set of requestors may be moving to the second stage of the round-robin arbiter 300 tree.

As such, method 600 may be used to achieve round-robin arbitration results for a large volume of requests and may provide true fair round-robin arbitration among all the requests.

Figure 7:
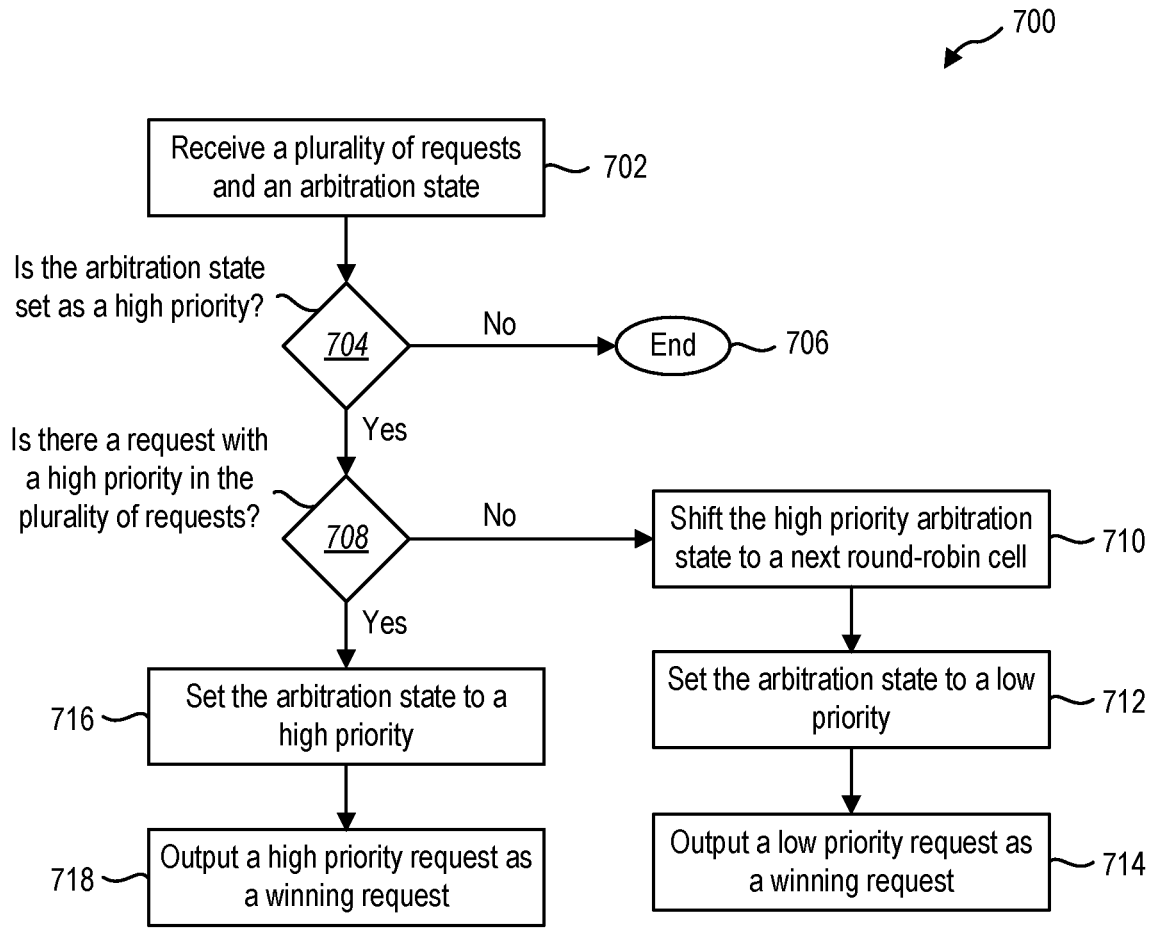
FIG. 7 illustrates an example method for shifting priority within a stage of a round-robin arbiter in accordance with implementations of the present disclosure.

Referring now to FIG. 7, illustrated is an example method 700 for determining a winning request (e.g., winning request 14, 18) in a round-robin cell 306 of a round-robin arbiter 300 tree (FIG. 3). The round-robin cell 306 includes a combination of a plurality of flip flops, muxes, priority encoders, logic gates (and, or, not), and a set of state flip flops placed in an order in communication with each other to receive a plurality of requests 22 and determine a winning request 14, 18 for the plurality of requests 22. Method 700 may be performed by a plurality of round-robin cells 306 in a first stage (e.g., stage 0) of the round-robin arbiter 300 tree. The actions of method 700 may be discussed in reference to the architectures of FIGS. 3 and 4.

At 702, method 700 includes receiving a plurality of requests and an arbitration state. The round-robin cell 306 receives a plurality of requests 22 and an in-priority bit 20 that indicates an arbitration state of the round-robin cell 306. For example, the plurality of request 22 may be a group of 32 requests received from one requestor of a set of requestors (e.g., 12a, 12b, 12c) and the in-priority bit 20 may be a 32 bit priority that adds to 1024. The arbitration state of the round-robin cell 306 may include a high priority or a low priority. A high priority may indicate that the round-robin cell 306 has the highest priority (e.g., next to or adjacent to the round-robin cell that received the last grant) and may start a next round of the arbitration. A low priority may indicate that the round-robin cell 306 recently received a grant (e.g., had a winning request) and/or recently started an arbitration round.

At 704, method 700 includes determining whether the arbitration state is set as a high priority. The round-robin arbiter 300 may only have one round-robin cell 306 that includes a high priority in-priority bit 20 (e.g., one bit of the 32 bits set to a "1" with the remaining bits set to "0"). For example, the round-robin cell 306 may have the arbitration state set with a high priority (e.g., one bit of the in-priority bit 20 set to "1"). Another example may include the round-robin cell 306 may have the arbitration state set to a low priority (e.g., all bits of the in-priority bit 20 set to "0").

At 706, method 700 ends if the arbitration state is set as a low priority. For example, if the in-priority bit 20 has all bits set to "0", the round-robin cell 306 may have a low priority arbitration state and method 700 may end.

At 708, method 700 includes determining whether the round-robin cell has a request with a high priority in the plurality of requests if the arbitration state is set to a high priority. For example, if the in-priority bit 20 has at least one bit set to "1", the round-robin cell 306 may have a high priority arbitration state and may determine whether any of the requests received include a high priority request. The round-robin cell 306 performs an upper mask to determine whether any of the requests 22 include a high priority request.

At 710, method 700 includes shifting the high priority arbitration state to a next round-robin cell if the round-robin cell does not have a high priority request. If the round-robin cell 306 does not have a granted high priority request 22, the round-robin cell 306 shifts the arbitration state of a high priority to a next round-robin cell using the outpriority shift 26. The next round-robin cell may be directly to the left of the round-robin cell. In addition, the next round-robin cell may be a round-robin cell that has a high priority request identified. As such, the arbitration state of a high priority is set to a next round-robin cell and the high priority arbitration state shifts to the next round-robin cell. The next round-robin cell receives the arbitration state change through the in-priority shift 28, and the next round-robin cell may perform the same processing to identify whether the next round-robin cell 306 has a granted high priority request.

At 712, method 700 includes setting the arbitration state to a low priority for the round-robin cell. The round-robin cell 306 sets the out priority arbitration state 30 to low. The out priority arbitration state 30 is stored in a flop of the round-robin cell 306 to propagate on the next clock edge to the round-robin cell 306 in stage 1 (e.g., S1) of the round-robin arbiter 300 tree.

At 714, method 700 includes outputting a low priority request 714. If the round-robin cell 306 does not have a high priority request 22, the round-robin cell 306 may output a granted low priority request 22 as the winning request 14.

At 716, method 700 includes setting the arbitration state to a high priority. If the round-robin cell 306 has a granted high priority request 22, the round-robin cell 306 sets the out priority arbitration state 30 as high. The out priority arbitration state 30 is stored in a flop of the round-robin cell 306 to propagate on the next clock edge to the round-robin cell 306 in stage 1 (e.g., S1) of the round-robin arbiter 300 tree.

At 718, method 700 includes outputting a high priority request as a winning request. If the round-robin cell 306 has one or more high priority requests 22, the upper mask determines one high priority request for the granted high priority request 22. The round-robin cell 306 may output the granted high priority request 22 as the winning request 14. The winning request 14 is stored in a flop of the round-robin cell 306 to propagate on the next clock edge to the round-robin cell 306 in stage 1 (e.g., S1) of the round-robin arbiter 300 tree.

Figure 8:
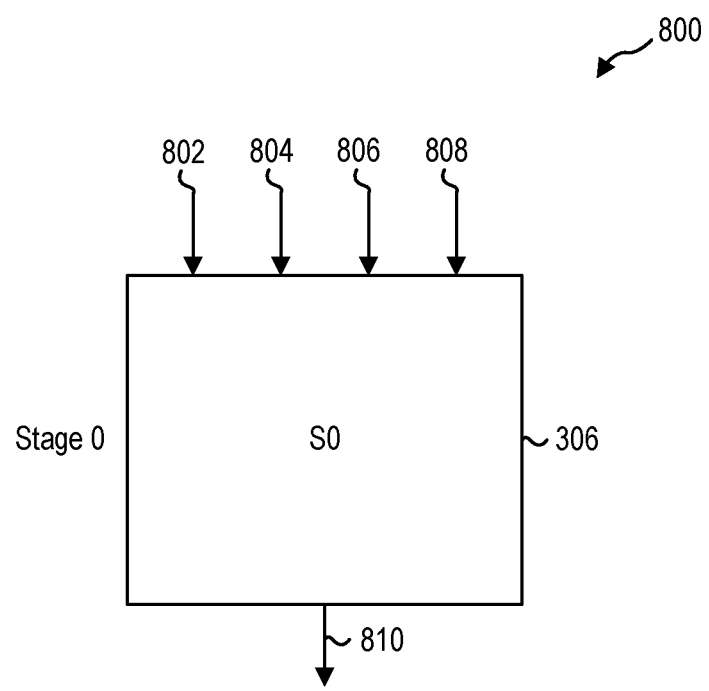
FIG. 8 illustrates an example of a single stage arbiter with a single round-robin cell in accordance with implementations of the present disclosure.

Referring now to FIG. 8, illustrated is a single stage arbiter 800 with a single stage (e.g., stage 0) and a single round-robin cell 306 (e.g., SO). The single stage arbiter 800 may be a 4:1 arbiter that uses a round-robin cell 306 discussed above. The single stage arbiter 800 may receive four incoming requests 802, 804, 806, 808 and may output a single winning request 810.

In the below examples, "req" indicates the incoming requests (e.g., 802, 804, 806, 808); "req_vld" indicates whether the request is valid; "state" is the current round robin state; "state shifted" is the state shifted left by one (with wrap around) to determine next arbitration priority; "state next" is the next round state based on current round winner flop input (the state is updated with this value on the next clock edge); "result" is the result of the arbitration; and "result_vld" is the result valid. In addition, in the below examples, each round-robin cell 306 may have a "hi_mask" an output of the upper mask; a "low_mask" an output of the lower mask; a "hi_masked_req" a request masked by a "hi_mask"; a "low_masked_req" a request masked by a "low_mask"; a "hi_gnt" a granted request among the "hi_masked_req"; a "hi_gnt" a granted request among the "hi_masked_req"; a "low_gnt" a granted request among the "low_masked_req"; "gnt" a granted request when combining the "hi_gnt" and "low_gnt" (the high grant has priority) as a mux result; "out_winner_nxt" the out winner flop input that will propagate the winner output on the next clock edge.

The below example illustrates a full request processed by the single state arbiter 800 at different clock cycles where all request bits are set.

At a first clock cycle, where T=0:

```
Req = 4'b1111
Req_vld = 1'b1
State = 4'b1000
State Shifted = 4'b0001
S0.in_req =4'b1111
S0.in_pri = 4'b0001
S0.in_winner = <none> - There is no prior state, so M (width of previous
    stage winner) = 0.
S0.hi_mask = 4'b1111
S0.low_mask = 4'b0000
S0.hi_masked_req = 4'b1111
S0.low_masked_req = 4'b0000
S0.hi_gnt = 2'd0
S0.low_gnt = 2'd0
S0.gnt = 2'd0
S0.out_winner_nxt = 2'd0
State next = 4'b0001
Below signals are flop outputs and contain results from previous cycle:
    S0.out_winner = 2'd0
    Result = 2'd0
    Result_vld = 1'b0
```

At a second clock cycle, where T=1:

```
Req = 4'b1111
Req_vld = 1'b1
State = 4'b0001
State Shifted = 4'b0010
S0.in_req =4'b1111
S0.in_pri = 4'b0010
S0.in_winner = <none> - There is no prior state, so M (width of previous
    stage winner) = 0.
S0.hi_mask = 4'b1110
S0.low_mask = 4'b0001
S0.hi_masked_req = 4'b1110
S0.low_masked_req = 4'b0001
S0.hi_gnt = 2'd1
S0.low_gnt = 2'd0
S0.gnt = 2'd1
S0.out_winner_nxt = 2'd1
State next = 4'b0010
Note: below signals are flop outputs and contain results from previous
cycle:
    S0.out_winner = 2'd0
    Result = 2'd0
    Result_vld = 1'b1
```

At a third clock cycle, where T=2:

```
Req = 4'b1111
State = 4'b0010
State Shifted = 4'b0100
S0.in_req =4'b1111
S0.in_pri = 4'b0100
```

```
S0.in_winner = <none> - There is no prior state, so M (width of previous
    stage winner) = 0.
S0.hi_mask = 4'b1100
S0.low_mask = 4'b0011
S0.hi_masked_req = 4'b1100
S0.low_masked_req = 4'b0011
S0.hi_gnt = 2'd2
S0.low_gnt = 2'd0
S0.gnt = 2'd2
S0.out_winner_nxt = 2'd2
State next = 4'b0100
Note: below signals are flop outputs and contain results from previous
cycle:
    S0.out_winner = 2'd1
    Result = 2'd1
    Result_vld = 1'b1
```

At a fourth clock cycle, where T=3, the results are 2'd2. At a fifth clock cycle, where T=4, the results are 2'd3, and at a sixth clock cycle, where T=5, the results are 2'd0.

The below example illustrates a request where not all bits are set. In the below example, the state changes based on the winner. In the previous example, the state shifted by one every round, but in the below example, the state will move based on

```
Req = 4'b1010
Req_vld = 1'b1
State = 4'b1000
State Shifted = 4'b0001
S0.in req =4'b1010
S0.in_pri = 4'b0001
S0.in_winner = <none> - There is no prior state, so M (width of previous
    stage winner) = 0.
S0.hi_mask = 4'b1111
S0.low_mask = 4'b0000
S0.hi_masked_req = 4'b1010
S0.low_masked_req = 4'b0000
S0.hi_gnt = 2'd1
S0.low_gnt = 2'd0
S0.gnt = 2'd1
S0.out_winner_nxt = 2'd1
State next = 4'b0010
Note: below signals are flop outputs and contain results from previous
cycle:
    S0.out_winner = 2'd0
    Result = 2'd0
    Result_vld = 1'b0
```

```
Req = 4'b1010
Req_vld = 1'b1
State = 4'b0010
State Shifted = 4'b0100
S0.in_req =4'b1010
S0.in_pri = 4'b0100
S0.in_winner = <none> - There is no prior state, so M (width of previous
    stage winner) = 0.
S0.hi_mask = 4'b1100
S0.low_mask = 4'b0011
S0.hi_masked_req = 4'b1000
S0.low_masked_req = 4'b0010
S0.hi_gnt = 2'd3
S0.low_gnt = 2'd1
S0.gnt = 2'd3
S0.out_winner_nxt = 2'd3
State next = 4'b1000
Note: below signals are flop outputs and contain results from previous
cycle:
    S0.out_winner = 2'd1
    Result = 2'd1
    Result_vld = 1'b1
```

At a third clock cycle, where T=2, the below signals are flop outputs and contain results from the previous cycle:

```
<omitted>
S0.out_winner = 2'd3
Result = 2'd3
Result_vld = 1'b1
```

Figure 9:
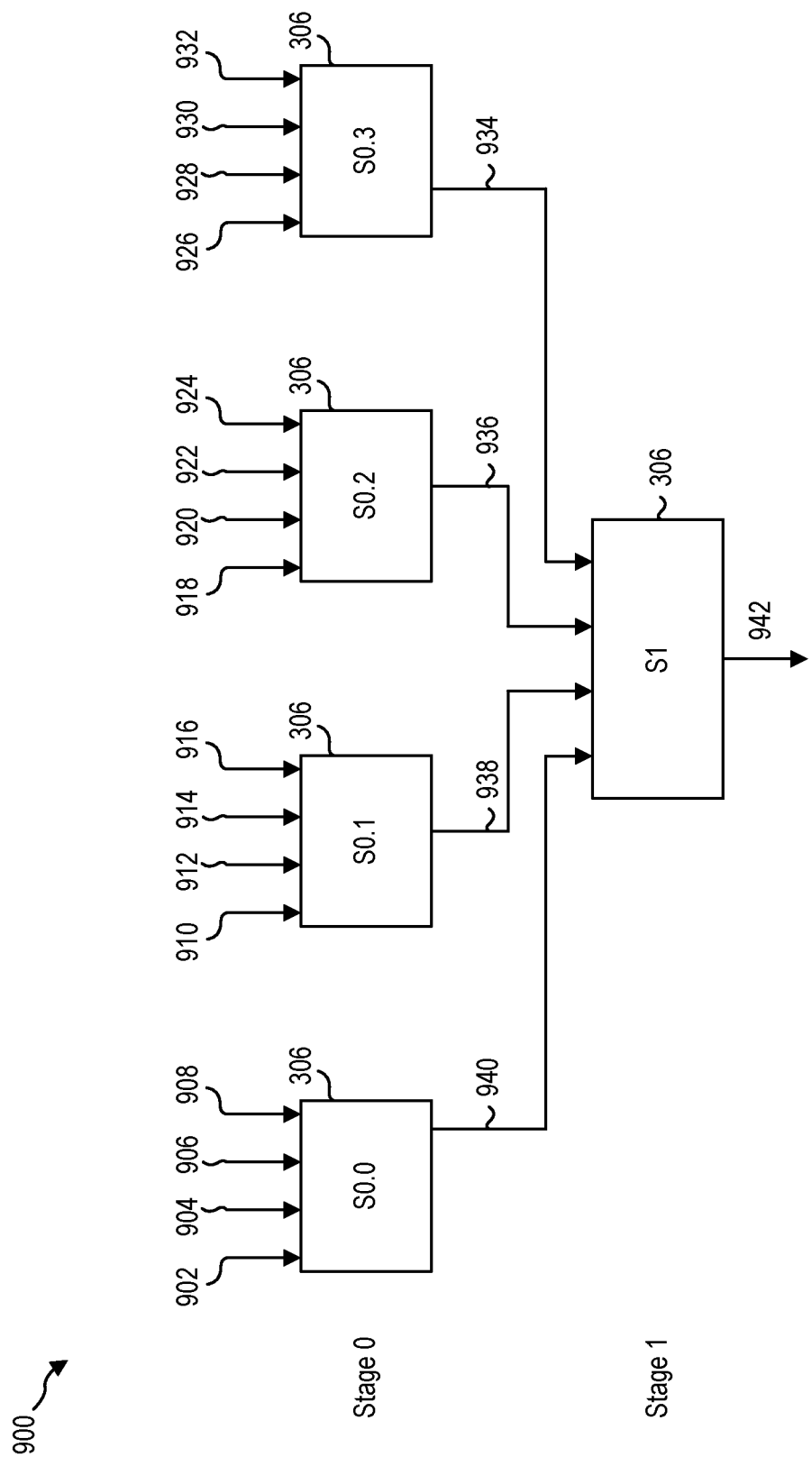
FIG. 9 illustrates an example dual stage arbiter tree in accordance with implementations of the present disclosure.

Referring now to FIG. 9, illustrated is a dual stage arbiter 900 with two stages (e.g., stage 0, stage 1) and five round-robin cells 306 (e.g., S0.0, S0.1, S0.2, S0.3, S1). The dual stage arbiter 900 may be a 16:1 arbiter that uses four (4:1) round-robin cells 306 in stage 0 (e.g., S0.0, S0.1, S0.2, S0.3) and one (4:1) round-robin cell 306 in stage 1 (e.g., S1). The dual stage arbiter 900 may receive sixteen incoming requests 902, 904, 906, 908, 910, 912, 914, 916, 918, 920, 922, 924, 926, 928, 930, 932 and may output a single winning request 942. The outputs 940, 938, 936, 934 from the round-robin cells 306 in stage 0 (e.g., S0.0, 50.1, S0.2, S0.3) are the inputs for the round-robin cell 306 in stage 1 (e.g., S1).

In the below examples, "req" indicates the incoming requests (e.g., 802, 804, 806, 808); "req_vld" indicates whether the request is valid; "state" is the current round robin state; "state shifted" is the state shifted left by one (with wrap around) to determine next arbitration priority; "state next" is the next round state based on current round winner flop input (the state is updated with this value on the next clock edge); "result" is the result of the arbitration; and "result_vld" is the result valid. In addition, in the below examples, each round-robin cell 306 may have a "hi_mask" an output of the upper mask; a "low_mask" an output of the lower mask; a "hi_masked_req" a request masked by a "hi_mask"; a "low_masked_req" a request masked by a "low_mask"; a "hi_gnt" a granted request among the "hi_masked_req"; a "hi_gnt" a granted request among the "hi_masked_req"; a "low_gnt" a granted request among the "low_masked_req"; "gnt" a granted request when combining the "hi_gnt" and "low_gnt" (the high grant has priority) as a mux result; "out_winner_nxt" the out winner flop input that will propagate the winner output on the next clock edge.

The below example illustrates a full request processed by the dual state arbiter 900 at different clock cycles where all request bits are set.

At a first clock cycle, where T=0:

```
Req = 16'b1111_1111_1111_1111
Req_vld = 1'b1
State = 16'b1000_0000_0000_0000
State Shifted = 16'b0000_0000_0000_0001
S0.0.in_req =4'b1111
S0.0.in_pri = 4'b0001
S0.0.in_winner = <none> - There is no prior state, so M (width of previous stage winner) = 0.
S0.0.hi_mask = 4'b1111
S0.0.low_mask = 4'b0000
S0.0.hi_masked_req = 4'b1111
S0.0.low_masked_req = 4'b0000
S0.0.hi_gnt = 2'd0
S0.0.low_gnt = 2'd0
S0.0.gnt = 2'd0
S0.0.out_winner_nxt = 2'd0
S0.0.out_req_nxt = 2'b1
S0.0.out_pri_nxt = 2'b1
S0.1.in_req =4'b1111
S0.1.in_pri = 4'b0000
S0.1.in_winner = <none> - There is no prior state, so M (width of previous stage winner) = 0.
S0.1.hi_mask = 4'b0000
S0.1.low_mask = 4'b1111
```

-continued

```
S0.1.hi_masked_req = 4'b0000
S0.1.low_masked_req = 4'b1111
S0.1.hi_gnt = 2'd0
S0.1.low_gnt = 2'd0
S0.1.gnt = 2'd0
S0.1.out_winner_nxt = 2'd0
S0.1.out_req_nxt = 2'b1
S0.1.out_pri_nxt = 2'b0
<S0.2 and S0.3 are the same as S0.1>
S1.in_req =4'b0000 (none of the out_req_nxt have propagated yet)
S1.in_pri = 4'b0000 (none of the out_pri_nxt have propagated yet)
S1.in_winner = [2'd0,2'd0,2'd0,2'd0] (none of the out_winner_nxt have propagated yet)
S1.out_winner_nxt = 4'd0
State nxt = 16'b000_0000_0000_0000 (will not get flopped since valid for S1 is still low)
Result = 4'd0
Result_vld = 1'b0
```

At a second clock cycle, where T=1:

```
Req_vld = 1'b0 (deassert request - can only service one request every 2 cycles with one state)
S0.0.out_winner = 2'd0
S0.0.out_req = 2'b1
S0.0.out_pri = 2'b1
S0.1.out_winner = 2'd0
S0.1.out_req = 2'b1
S0.1.out_pri = 2'b0
<S0.2 and S0.3 are the same as S0.1>
S1.in_req =4'b1111
S1.in_pri = 4'b0001
S1.in_winner = [2'd0,2'd0,2'd0,2'd0]
S1.hi_mask = 4'b1111
S1.low_mask = 4'b0000
S1.hi_masked_req = 4'b1111
S1.low_masked_req = 4'b0000
S1.hi_gnt = 2'd0
S1.low_gnt = 2'd0
S1.gnt = 2'd0
S1.out_winner_nxt = 4'd0 (Signal is concatenation of {S1.gnt, S1.in_winner[S1.gnt]})
State nxt = 16'b000_0000_0000_0001 (will be flopped)
Result = 4'd0
Result_vld = 1'b0
```

At a third clock cycle, where T=2:

```
Req = 16'b1111_1111_1111_1111
Req_vld = 1'b1
State = 16'b1000_0000_0000_0001
State Shifted = 16'b0000_0000_0000_0010
S0.0.in_req =4'b1111
S0.0.in_pri = 4'b0010
S0.0.in_winner = <none> - There is no prior state, so M (width of previous stage winner) = 0.
S0.0.hi_mask = 4'b1110
S0.0.low_mask = 4'b0001
S0.0.hi_masked req = 4'b1110
S0.0.low_masked_req = 4'b0001
S0.0.hi_gnt = 2'd1
S0.0.low_gnt = 2'd0
S0.0.gnt = 2'd1
S0.0.out_winner_nxt = 2'd1
S0.0.out_req_nxt = 2'b1
S0.0.out_pri_nxt = 2'b1
S0.1.in_req =4'b1111
S0.1.in_pri = 4'b0000
S0.1.in_winner = <none> - There is no prior state, so M (width of previous stage winner) = 0.
S0.1.hi_mask = 4'b0000
S0.1.low_mask = 4'b1111
S0.1.hi_masked_req = 4'b0000
S0.1.low_masked_req = 4'b1111
S0.1.hi_gnt = 2'd0
```

```
S0.1.low_gnt = 2'd0
S0.1.gnt = 2'd0
S0.1.out_winner_nxt = 2'd0
S0.1.out_req_nxt = 2'b1
S0.1.out_pri_nxt = 2'b0
<S0.2 and S0.3 are the same as S0.1>
S1.in_req =4'b1111 (same value as T=1, since there was no new S0
    request in T=1)
S1.in_pri = 4'b0001 (same value as T=1, since there was no new S0
    request in T=1)
S1.in_winner = [2'd0,2'd0,2'd0,2'd0] (same value as T=1, since there was
    no new S0 request in T=1)
S1.out_winner_nxt = 4'd0
State nxt = 16'b000_0000_0000_0001 (will not get flopped since valid
    for S1 is low this cycle)
Result = 4'd0
Result_vld = 1'b1 (Result from T=0 request makes it to the output)
```

At a fourth clock cycle, where T=3:

```
Req_vld = 1'b0 (deassert request - can only service one request every 2
    cycles with one state)
S0.0.out_winner = 2'd1
S0.0.out_req = 2'b1
S0.0.out_pri = 2'b1
S0.1.out_winner = 2'd0
S0.1.out_req = 2'b1
S0.1.out_pri = 2'b0
<S0.2 and S0.3 are the same as S0.1>
S1.in_req =4'b1111
S1.in_pri = 4'b0001
S1.in_winner = [2'd0,2'd0,2'd0,2'd1]
S1.hi_mask = 4'b1111
S1.low_mask = 4'b0000
S1.hi_masked_req = 4'b1111
S1.low_masked_req = 4'b0000
S1.hi_gnt = 2'd0
S1.low_gnt = 2'd0
S1.gnt = 2'd0
S1.out_winner_nxt = 4'd1 (Signal is concatenation of {S1.gnt,
    S1.in_winner[S1.gnt]})
State nxt = 16'b000_0000_0000_0010 (will be flopped)
Result = 4'd0
Result_vld = 1'b0 (deasserted because there was no new result from S1
    in T=2)
```

At a fifth clock cycle, where T=4:

```
<omitted>
Result = 4'd1
Result_vld = 1'b1
```

The below example illustrates a request where not all bits are set processed by the dual state arbiter 900 at different clock cycles. In the below example, the priority shift bits are changed.

At a first clock cycle, where T=0:

```
Req = 16'b1010_0000_1100_0000
Req_vld = 1'b1
State = 16'b1000_0000_0000_0000
State Shifted = 16'b0000_0000_0000_0001
S0.0.in_req =4'b0000
S0.0.in_pri = 4'b0001
S0.0.in_pri_shift = 1'b0
S0.0.in_winner = <none> - There is no prior state, so M (width of
    previous stage winner) = 0.
S0.0.hi_mask = 4'b1111
S0.0.low_mask = 4'b0000
S0.0.hi_masked_req = 4'b0000
S0.0.low_masked_req = 4'b0000
S0.0.hi_gnt = 2'd0
S0.0.low_gnt = 2'd0
S0.0.gnt = 2'd0
S0.0.out_winner_nxt = 2'd0
S0.0.out_req_nxt = 2'b0
S0.0.out_pri_nxt = 2'b0
S0.0.out_pri_shift = 1'b1
S0.1.in_req =4'b1100
S0.1.in_pri = 4'b0000
S0.1.in_pri_shift = 1'b1 (connected to S0.0.out_pri_shift)
S0.1.in_winner = <none> - There is no prior state, so M (width of
    previous stage winner) = 0.
S0.1.hi_mask = 4'b0000
S0.1.low_mask = 4'b1111
S0.1.hi_masked_req = 4'b0000
S0.1.low_masked_req = 4'b1100
S0.1.hi_gnt = 2'd0
S0.1.low_gnt = 2'd2
S0.1.gnt = 2'd2
S0.1.out_winner_nxt = 2'd2
S0.1.out_req_nxt = 2'b1
S0.1.out_pri_nxt = 2'b1
S0.1.out_pri_shift = 2'b0
S0.2.in_req =4'b0000
S0.2.in_pri = 4'b0000
S0.2.in_pri_shift = 1'b0
S0.2.in_winner = <none> - There is no prior state, so M (width of
    previous stage winner) = 0.
S0.2.hi_mask = 4'b0000
S0.2.low_mask = 4'b1111
S0.2.hi_masked_req = 4'b0000
S0.2.low_masked_req = 4'b0000
S0.2.hi_gnt = 2'd0
S0.2.low_gnt = 2'd0
S0.2.gnt = 2'd0
S0.2.out_winner_nxt = 2'd0
S0.2.out_req_nxt = 2'b0
S0.2.out_pri_nxt = 2'b0
S0.2.out_pri_shift = 1'b0
S0.3.in_req =4'b1010
S0.3.in_pri = 4'b0000
S0.3.in_pri_shift = 1'b0
S0.3.in_winner = <none> - There is no prior state, so M (width of
    previous stage winner) = 0.
S0.3.hi_mask = 4'b0000
S0.3.low_mask = 4'b1111
S0.3.hi_masked_req = 4'b0000
S0.3.low_masked_req = 4'b1010
S0.3.hi_gnt = 2'd0
S0.3.low_gnt = 2'd1
S0.3.gnt = 2'd1
S0.3.out_winner_nxt = 2'd1
S0.3.out_req_nxt = 2'b1
S0.3.out_pri_nxt = 2'b0
S0.3.out_pri_shift = 1'b0
```

At a second clock cycle, where T=1:

```
Req_vld = 1'b0
S0.0.out_winner = 2'd0
S0.0.out_req = 2'b0
S0.0.out_pri = 2'b0
S0.1.out_winner = 2'd2
S0.1.out_req = 2'b1
S0.1.out_pri = 2'b1
S0.2.out_winner = 2'd0
S0.2.out_req = 2'b0
S0.2.out_pri = 2'b0
S0.3.out_winner = 2'd1
S0.3.out_req = 2'b1
S0.3.out_pri = 2'b0
S1.in_req =4'b1010
S1.in_pri = 4'b0010
S1.in_winner = [2'd1,2'd0,2'd2,2'd0]
S1.hi_mask = 4'b1110
S1.low_mask = 4'b0001
S1.hi_masked_req = 4'b1010
```

```
    S1.low_masked_req = 4'b0000
    S1.hi_gnt = 2'd1
    S1.low_gnt = 2'd0
    S1.gnt = 2'd1
    S1.out_winner_nxt = 4'd6 (Signal is concatenation of {S1.gnt,
        S1.in_winner[S1.gnt]})
    State nxt = 16'b000_0000_0100_0000 (will be flopped)
```

At a third clock cycle, where T=2:

```
            Req = <omitted>
            Req_vld = 1'b1
            State = 16'b0000_0000_0100_0000
            State Shifted = 16'b0000_0000_1000_0000
            Result = 4'd6
            Result_vld = 1'b1
```

The below example illustrates a request where not all bits are set processed by the dual state arbiter 900 at different clock cycles. In the below example, there are now two states: State0 and State1 and there is an additional Request bit for Req_ID (0 or 1). In the example below the states alternate so all arbitration stages are constantly in operation. Should Req_ID repeat for two cycles, then there would be logic to block arbitration every other cycle for the current arbitration to finish and the state for that ID to be updated. In addition, this example also shows what happens if priority shifts from S0.0 to S0.1 but S0.1 does not have any valid requests.

At a first clock cycle, where T=0:

```
Req = 16'b1110_1001_0000_0000
Req_ID = 1'b0
Req_vld = 1'b1
State0 = 16'b1000_0000_0000_0000
State1= 16'b1000_0000_0000_0000
State Shifted = 16'b0000_0000_0000_0001 (state is selected based on ID
    and then shifted)
S0.0.in_req =4'b0000
S0.0.in_pri = 4'b0001
S0.0.in_pri_shift = 1'b0
S0.0.in_winner = <none> - There is no prior state, so M (width of
    previous stage winner) = 0.
S0.0.hi_mask = 4'b1111
S0.0.low_mask = 4'b0000
S0.0.hi_masked_req = 4'b0000
S0.0.low_masked_req = 4'b0000
S0.0.hi_gnt = 2'd0
S0.0.low_gnt = 2'd0
S0.0.gnt = 2'd0
S0.0.out_winner_nxt = 2'd0
S0.0.out_req_nxt = 2'b0
S0.0.out_pri_nxt = 2'b0
S0.0.out_pri_shift = 1'b1
S0.1.in_req =4'b0000
S0.1.in_pri = 4'b0000
S0.1.in_pri_shift = 1'b1 (connected to S0.0.out_pri_shift)
S0.1.in_winner = <none> - There is no prior state, so M (width of
    previous stage winner) = 0.
S0.1.hi_mask = 4'b0000
S0.1.low_mask = 4'b1111
S0.1.hi_masked req = 4'b0000
S0.1.low_masked_req = 4'b0000
S0.1.hi_gnt = 2'd0
S0.1.low_gnt = 2'd0
S0.1.gnt = 2'd0
S0.1.out_winner_nxt = 2'd0
S0.1.out_req_nxt = 2'b0 (no valid requests means req_nxt will be 0)
S0.1.out_pri_nxt = 2'b1 (priority is still set because in_pri_shift)
S0.1.out_pri_shift = 2'b0 (priority does not shift by more than one cell.
    Out_pri_shift is based purely on in_pri and in_req, it does not take
in_pri_shift into account)
S0.2.in_req =4'b1001
S0.2.in_pri = 4'b0000
S0.2.in_pri_shift = 1'b0
S0.2.in_winner = <none> - There is no prior state, so M (width of
    previous stage winner) = 0.
S0.2.hi_mask = 4'b0000
S0.2.low_mask = 4'b1111
S0.2.hi_masked_req = 4'b0000
S0.2.low_masked_req = 4'b1001
S0.2.hi_gnt = 2'd0
S0.2.low_gnt = 2'd0
S0.2.gnt = 2'd0
S0.2.out_winner_nxt = 2'd0
S0.2.out_req_nxt = 2'b1
S0.2.out_pri_nxt = 2'b0
S0.2.out_pri_shift = 1'b0
S0.3.in_req =4'b1110
S0.3.in_pri = 4'b0000
S0.3.in_pri_shift = 1'b0
S0.3.in_winner = <none> - There is no prior state, so M (width of
    previous stage winner) = 0.
S0.3.hi_mask = 4'b0000
S0.3.low_mask = 4'b1111
S0.3.hi_masked_req = 4'b0000
S0.3.low_masked_req = 4'b1110
S0.3.hi_gnt = 2'd0
S0.3.low_gnt = 2'd1
S0.3.gnt = 2'd1
S0.3.out_winner_nxt = 2'd1
S0.3.out_req_nxt = 2'b1
S0.3.out_pri_nxt = 2'b0
S0.3.out_pri_shift = 1'b0
```

At a second clock cycle, where T=1:

```
Req = 16'b0010_0001_0000_0110
Req_ID = 1'b1
Req_vld = 1'b1
State0 = 16'b1000_0000_0000_0000 (no update, previous arbitration is
    still in S0)
State1= 16'b1000_0000_0000_0000
State Shifted = 16'b0000_0000_0000_0001
S0.0.in_req =4'b0110
S0.0.in_pri = 4'b0001
S0.0.in_pri_shift = 1'b0
S0.0.in_winner = <none> - There is no prior state, so M (width of
    previous stage winner) = 0.
S0.0.hi_mask = 4'b1111
S0.0.low_mask = 4'b0000
S0.0.hi_masked_req = 4'b0110
S0.0.low_masked_req = 4'b0000
S0.0.hi_gnt = 2'd1
S0.0.low_gnt = 2'd0
S0.0.gnt = 2'd1
S0.0.out_winner_nxt = 2'd1
S0.0.out_req_nxt = 2'b1
S0.0.out_pri_nxt = 2'b1
S0.0.out_pri_shift = 1'b0
Flopped values from previous round:
    S0.0.out_winner = 2'd0
    S0.0.out_req = 2'b0
    S0.0.out_pri = 2'b0
S0.1.in_req =4'b0000
S0.1.in_pri = 4'b0000
S0.1.in_pri_shift = 1'b0
S0.1.in_winner = <none> - There is no prior state, so M (width of
    previous stage winner) = 0.
S0.1.hi_mask = 4'b0000
S0.1.low_mask = 4'b1111
S0.1.hi_masked_req = 4'b0000
S0.1.low_masked_req = 4'b0000
S0.1.hi_gnt = 2'd0
S0.1.low_gnt = 2'd0
S0.1.gnt = 2'd0
S0.1.out_winner_nxt = 2'd0
S0.1.out_req_nxt = 2'b0
S0.1.out_pri_nxt = 2'b0
S0.1.out_pri_shift = 2'b0
```

```
Flopped values from previous round:
   S0.1.out_winner = 2'd0
   S0.1.out_req = 2'b0
   S0.1.out_pri = 2'b1
S0.2.in_req =4'b0001
S0.2.in_pri = 4'b0000
S0.2.in_pri_shift = 1'b0
S0.2.in_winner = <none> - There is no prior state, so M (width of
   previous stage winner) = 0.
S0.2.hi_mask = 4'b0000
S0.2.low_mask = 4'b1111
S0.2.hi_masked_req = 4'b0000
S0.2.low_masked_req = 4'b0001
S0.2.hi_gnt = 2'd0
S0.2.low_gnt = 2'd0
S0.2.gnt = 2'd0
S0.2.out_winner_nxt = 2'd0
S0.2.out_req_nxt = 2'b1
S0.2.out_pri_nxt = 2'b0
S0.2.out_pri_shift = 1'b0
Flopped values from previous round:
   S0.2.out_winner = 2'd0
   S0.2.out_req = 2'b1
   S0.2.out_pri = 2'b0
S0.3.in_req =4'b0010
S0.3.in_pri = 4'b0000
S0.3.in_pri_shift = 1'b0
S0.3.in_winner = <none> - There is no prior state, so M (width of
   previous stage winner) = 0.
S0.3.hi_mask = 4'b0000
S0.3.low_mask = 4'b1111
S0.3.hi_masked req = 4'b0000
S0.3.low_masked_req = 4'b0010
S0.3.hi_gnt = 2'd0
S0.3.low_gnt = 2'd1
S0.3.gnt = 2'd1
S0.3.out_winner_nxt = 2'd1
S0.3.out_req_nxt = 2'b1
S0.3.out_pri_nxt = 2'b0
S0.3.out_pri_shift = 1'b0
Flopped values from previous round:
   S0.3.out_winner = 2'd1
   S0.3.out_req = 2'b1
   S0.3.out_pri = 2'b0
S1.in_req =4'b1100
S1.in_pri = 4'b0010
S1.in_winner = [2'd1,2'd0,2'd0,2'd0]
S1.hi_mask = 4'b1110
S1.low_mask = 4'b0001
S1.hi_masked_req = 4'b1100
S1.low_masked_req = 4'b0000
S1.hi_gnt = 2'd2
S1.low_gnt = 2'd0
S1.gnt = 2'd2
S1.out_winner_nxt = 4'd8 (Signal is concatenation of {S1.gnt,
   S1.in_winner[S1.gnt]})
State0 nxt = 16'b000_0001_0000_0000 (will be flopped)
```

At a third clock cycle, where T=2:

```
Req = <omitted>
Req_vld = 1'b1
Req_ID = 1'b0
State0 = 16'b0000_0001_0000_0000
State1 = 16'b0000_0000_0100_0000 (not updated yet, still ongoing)
State Shifted = 16'b0000_0010_0000_0000
S0.0.out_winner = 2'd1
S0.0.out_req = 2'b1
S0.0.out_pri = 2'b1
S0.1.out_winner = 2'd0
S0.1.out_req = 2'b0
S0.1.out_pri = 2'b0
S0.2.out_winner = 2'd0
S0.2.out_req = 2'b1
S0.2.out_pri = 2'b0
S0.3.out_winner = 2'd1
S0.3.out_req = 2'b1
```

```
S0.3.out_pri = 2'b0
S1.in_req =4'b1101
S1.in_pri = 4'b0001
S1.in_winner = [2'd1,2'd0,2'd0,2'd1]
S1.hi_mask = 4'b1111
S1.low_mask = 4'b0000
S1.hi_masked_req = 4'b1101
S1.low_masked_req = 4'b0000
S1.hi_gnt = 2'd0
S1.low_gnt = 2'd0
S1.gnt = 2'd0
S1.out_winner_nxt = 4'd1 (Signal is concatenation of {S1.gnt,
   S1.in_winner[S1.gnt]})
State1 nxt = 16'b000_0000_0000_0010 (will be flopped)
Result = 4'd8
Result ID = 4'd0
Result_vld = 1'b1
```

At a fourth clock cycle, where T=3:

```
Req = <omitted>
Req_vld = 1'b1
Req_ID = 1'b1
State0 = 16'b0000_0001_0000_0000
State1 = 16'b0000_0000_0100_0010
State Shifted = 16'b0000_0000_0000_0100
Result = 4'd1
Result ID = 4'd1
Result_vld = 1'b1
```

The techniques described herein may be implemented in hardware, software, firmware, or any combination thereof, unless specifically described as being implemented in a specific manner. Any features described as modules, components, or the like may also be implemented together in an integrated logic device or separately as discrete but interoperable logic devices. If implemented in software, the techniques may be realized at least in part by a non-transitory processor-readable storage medium comprising instructions that, when executed by at least one processor, perform one or more of the methods described herein. The instructions may be organized into routines, programs, objects, components, data structures, etc., which may perform particular tasks and/or implement particular data types, and which may be combined or distributed as desired in various embodiments.

Computer-readable mediums may be any available media that can be accessed by a general purpose or special purpose computer system. Computer-readable mediums that store computer-executable instructions are non-transitory computer-readable storage media (devices). Computer-readable mediums that carry computer-executable instructions are transmission media. Thus, by way of example, and not limitation, embodiments of the disclosure can comprise at least two distinctly different kinds of computer-readable mediums: non-transitory computer-readable storage media (devices) and transmission media.

As used herein, non-transitory computer-readable storage mediums (devices) may include RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

The steps and/or actions of the methods described herein may be interchanged with one another without departing from the scope of the claims. Unless a specific order of steps or actions is required for proper operation of the method that is being described, the order and/or use of specific steps and/or actions may be modified without departing from the scope of the claims.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The articles "a," "an," and "the" are intended to mean that there are one or more of the elements in the preceding descriptions. The terms "comprising," "including," and "having" are intended to be inclusive and mean that there may be additional elements other than the listed elements. Additionally, it should be understood that references to "one implementation" or "an implementation" of the present disclosure are not intended to be interpreted as excluding the existence of additional implementations that also incorporate the recited features. For example, any element described in relation to an implementation herein may be combinable with any element of any other implementation described herein. Numbers, percentages, ratios, or other values stated herein are intended to include that value, and also other values that are "about" or "approximately" the stated value, as would be appreciated by one of ordinary skill in the art encompassed by implementations of the present disclosure. A stated value should therefore be interpreted broadly enough to encompass values that are at least close enough to the stated value to perform a desired function or achieve a desired result. The stated values include at least the variation to be expected in a suitable manufacturing or production process, and may include values that are within 5%, within 1%, within 0.1%, or within 0.01% of a stated value.

A person having ordinary skill in the art should realize in view of the present disclosure that equivalent constructions do not depart from the spirit and scope of the present disclosure, and that various changes, substitutions, and alterations may be made to implementations disclosed herein without departing from the spirit and scope of the present disclosure. Equivalent constructions, including functional "means-plus-function" clauses are intended to cover the structures described herein as performing the recited function, including both structural equivalents that operate in the same manner, and equivalent structures that provide the same function. It is the express intention of the applicant not to invoke means-plus-function or other functional claiming for any claim except for those in which the words 'means for' appear together with an associated function. Each addition, deletion, and modification to the implementations that falls within the meaning and scope of the claims is to be embraced by the claims.

The present disclosure may be embodied in other specific forms without departing from its spirit or characteristics. The described embodiments are to be considered as illustrative and not restrictive. The scope of the disclosure is, therefore, indicated by the appended claims rather than by the foregoing description. Changes that come within the meaning and range of equivalency of the claims are to be embraced within their scope.

What is claimed is:

1. A method for round-robin arbitration implemented by a round-robin arbiter, comprising:
   receiving, at the round-robin arbiter, an arbitration state and a first group of requests from a first set of requestors for the round-robin arbitration, wherein the arbitration state indicates one round-robin cell of the one or more round-robin cells with a high priority;
   determining a preliminary winning request of the first group of requests using one or more round-robin cells in a first stage of the round-robin arbiter;
   outputting an intermediate arbitration state based on the first stage of the round-robin arbiter;
   determining a winning request based on the preliminary winning request and the intermediate arbitration state using a single round-robin cell in a second stage of the round-robin arbiter;
   updating the arbitration state based on the winning request; and
   starting a new round of arbitration for the first group of requests from the first set of requestors based on the arbitration state using the one or more round-robin cells in the first stage of the round-robin arbiter.

2. The method of claim 1, wherein updating the arbitration state based on the first stage of the round-robin arbiter includes identifying a round-robin cell of the one or more round-robin cells with the preliminary winning request.

3. The method of claim 1, wherein updating the arbitration state based on the winning request further includes shifting the arbitration state to a next round-robin cell directly to a left of the round-robin cell that has the winning request.

4. The method of claim 1, wherein the first group of requests are distributed evenly among the one or more round-robin cells of the first stage.

5. The method of claim 1, wherein the first stage of the round-robin arbiter occurs in a clock cycle and the second stage of the round-robin arbiter occurs in a second clock cycle.

6. The method of claim 3, wherein the preliminary winning request is a high priority request from the round-robin cell with a high priority.

7. The method of claim 5, further comprising:
   receiving, at the round-robin arbiter in the second clock cycle, a second group of requests from a second set of requestors for the round-robin arbitration and an arbitration state for the second group;
   determining a second preliminary winning request for the second group of requests using the one or more round-robin cells in the first stage of the round-robin arbiter; and
   outputting an intermediate arbitration state for the second group of requests based on the first stage of the round-robin arbiter.

8. The method of claim 6, wherein the arbitration state shifts to the next round-robin cell of the one or more round-robin cells of the first stage.

9. The method of claim 7, further comprising:
   determining, during a third clock cycle, a second winning request based on the second preliminary winning request and the intermediate arbitration state of the second group of requests using the single round-robin cell in the second stage of the round-robin arbiter and updating the arbitration state of the second group of requests based on the second winning request; and
   starting, during the third clock cycle, the new round of arbitration for the first group of requests from the first set of requestors based on the arbitration state using the one or more round-robin cells in the first stage of the round-robin arbiter.

10. A round-robin arbiter, comprising:
a plurality of round-robin cells that receive a plurality of requests from a set of requestors for round-robin arbitration and identify a winning request of the plurality of requests based on the round-robin arbitration;
a plurality of stages with a plurality of round-robin cells in communication with each other, wherein an output of a first stage of round-robin cells is an input to a next stage of round-robin cells; and
a state component in communication with the plurality of round-robin cells that maintains an arbitration state for the round-robin arbiter, wherein the arbitration state is updated based on the winning request by shifting the arbitration state to a next round-robin cell of the plurality of round-robin cells and the arbitration state is propagated between the plurality of stages.

11. The round-robin arbiter of claim 10, wherein a winning request is output from a last stage of round-robin cells and the arbitration state identifies which round-robin cell of the plurality of round-robin cells has the winning request.

12. The round-robin arbiter of claim 10, wherein the round-robin arbiter is further operable to start a new round of arbitration using the first stage of round-robin cells based on the arbitration state.

13. The round-robin arbiter of claim 10, wherein a number of clock cycles to perform the round-robin arbitration is equal to a number of stages in the plurality of stages.

14. The round-robin arbiter of claim 10, wherein the round-robin arbiter is implemented in an integrated circuit chip.

15. A round-robin cell for use with a round-robin arbiter, comprising:
a plurality of flip flops;
a plurality of muxes;
a plurality of priority encoders;
a plurality of logic gates; and
a set of state flip flops,
wherein the plurality of flip flops, the plurality of muxes, the plurality of priority encoders, the plurality of the logic gates, and the set of state flip flops are placed in an order in communication with each other and operable to:
receive a plurality of requests and an arbitration state of the round-robin cell, wherein the arbitration state indicates that the round-robin cell starts an arbitration round for the plurality of requests;
identify a winning request of the plurality of requests by determining whether the plurality of requests include at least one high priority request and outputting the at least one high priority request as the winning request;
update the arbitration state of the round-robin cell; and
propagate the arbitration state to a next stage in the arbitration round.

16. The round-robin cell of claim 15, wherein the plurality of flip flops, the plurality of muxes, the plurality of priority encoders, the plurality of the logic gates, and the set of state flip flops are further operable to: update the arbitration state of the round-robin cell to a high priority in response to determining that the plurality of requests include the at least one high priority request; and update the arbitration state of the round-robin cell to a low priority in response to determining that the plurality of requests do not include the at least one high priority request.

17. The round-robin cell of claim 16, wherein the plurality of flip flops, the plurality of muxes, the plurality of priority encoders, the plurality of the logic gates, and the set of state flip flops are further operable to:
shift the arbitration state to a next round-robin cell with a high priority request in response to determining that the plurality of requests do not include the at least one high priority request.

* * * * *